United States Patent
Guo et al.

(10) Patent No.: US 9,998,194 B2
(45) Date of Patent: Jun. 12, 2018

(54) PROCESSING METHOD FOR CHANNEL STATE INFORMATION, BASE STATION AND TERMINAL

(71) Applicant: ZTE CORPORATION, Guangdong (CN)

(72) Inventors: Senbao Guo, Shenzhen (CN); Yu Ngok Li, Shenzhen (CN); Yunfeng Sun, Shenzhen (CN); Junfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 318 days.

(21) Appl. No.: 14/440,037

(22) PCT Filed: Sep. 2, 2013

(86) PCT No.: PCT/CN2013/082779
§ 371 (c)(1),
(2) Date: Jun. 5, 2015

(87) PCT Pub. No.: WO2014/067341
PCT Pub. Date: May 8, 2014

(65) Prior Publication Data
US 2015/0349867 A1    Dec. 3, 2015

(30) Foreign Application Priority Data
Nov. 1, 2012  (CN) .......................... 2012 1 0429813

(51) Int. Cl.
*H04B 7/06*       (2006.01)
*H04B 7/024*      (2017.01)
(Continued)

(52) U.S. Cl.
CPC ........... *H04B 7/0626* (2013.01); *H04B 7/024* (2013.01); *H04B 7/0486* (2013.01);
(Continued)

(58) Field of Classification Search
CPC .... H04B 7/0626; H04B 7/024; H04B 7/0486; H04B 7/0632; H04L 1/0026; H04L 1/0029; H04L 1/003; H04L 1/16; H04W 24/10
See application file for complete search history.

(56) References Cited

U.S. PATENT DOCUMENTS 8,064,917 B2 * 11/2011 Aiba ..................... H04W 24/10
                                              370/329
9,401,787 B2 *  7/2016 Qi ......................... H04L 5/0007
(Continued)

FOREIGN PATENT DOCUMENTS

CN      101783776        7/2010
CN      102201897        9/2011
(Continued)

OTHER PUBLICATIONS

3GPP TSG RAN WG1 #70bis R1-124373 Qingdao, China Oct. 8-12, 2012 Agenda item: 7.4.4.1 Source: Samsung Title: Further details of reference process configuration and CSI multiplexing.*
(Continued)

Primary Examiner — Chi H Pham
Assistant Examiner — Weibin Huang
(74) Attorney, Agent, or Firm — Foley & Lardner LLP

(57) ABSTRACT

The present document relates to a method for processing channel state information (CSI), base station and terminal. The method for processing channel state information includes: a base station configuring a plurality of CSI processes for a terminal, each CSI process at least including information of a channel measurement part and information of an interference measurement part; when the base station configures corresponding CSI reference processes for partial or all CSI processes, at least limiting a rank indicator (RI) of the CSI processes for calculating a CSI report to be consistent with an RI of the CSI reference processes by configuring
(Continued)

the CSI reference processes; and for the CSI processes configured with the CSI reference processes, the base station receiving the CSI report of the CSI processes according to the RI, or the RI and a PTI, or the RI and a PMI0 corresponding to the CSI reference processes.

16 Claims, 2 Drawing Sheets

(51) Int. Cl.
   *H04W 24/10* (2009.01)
   *H04B 7/04* (2017.01)
   *H04L 1/00* (2006.01)

(52) U.S. Cl.
   CPC ........... *H04B 7/0632* (2013.01); *H04L 1/003* (2013.01); *H04L 1/0026* (2013.01); *H04L 1/0029* (2013.01); *H04W 24/10* (2013.01)

(56) References Cited

U.S. PATENT DOCUMENTS

| | | | | |
|---|---|---|---|---|
| 9,438,395 | B2* | 9/2016 | Kim | H04B 7/04 |
| 2010/0110982 | A1 | 5/2010 | Roh et al. | |
| 2012/0140708 | A1* | 6/2012 | Choudhury | H04W 72/082 370/328 |
| 2012/0201154 | A1* | 8/2012 | Chandrasekhar | H04W 24/10 370/252 |
| 2013/0102304 | A1* | 4/2013 | Lee | H04W 24/00 455/422.1 |
| 2013/0230013 | A1* | 9/2013 | Seo | H04L 27/2602 370/329 |
| 2013/0301560 | A1* | 11/2013 | Geirhofer | H04B 7/0621 370/329 |
| 2014/0003240 | A1* | 1/2014 | Chen | H04W 28/08 370/235 |
| 2015/0200754 | A1* | 7/2015 | Sayana | H04B 7/024 370/329 |

FOREIGN PATENT DOCUMENTS

| | | |
|---|---|---|
| CN | 102271031 | 12/2011 |
| CN | 102611536 | 7/2012 |
| CN | 102801498 | 11/2012 |
| EP | 2 124 459 | 11/2009 |
| EP | 2 677 671 | 12/2013 |
| RU | 2325045 | 5/2008 |
| WO | WO-2009/057081 | 5/2009 |
| WO | WO-2014/065564 | 5/2014 |

OTHER PUBLICATIONS

3GPP TSG RAN WG1 Meeting #70bis R1-124280 San Diego, USA, Oct. 8-12, 2012 Agenda Item: 7 .4.4.1 Source: MediaTek Inc. Title: CSI Multiplexing and Collision Handling in Periodic Feedback.*

CATT, "On common RI/subband among CSI processes," 3GPP TSG RAN WG1 Meeting #70bis, San Diego, USA Oct. 8-12, 2012, Agenda Item 7.4.4.1, R1-124096.

Japanese Office Action dated Jul. 5, 2016, from related application No. 2015-540025.

Extended European Search Report received in European Pat. App. No. 13851065.6 dated Nov. 2, 2015, 8 pages.

MediaTek Inc., "CSI Multiplexing and Collision Handling in Periodic Feedback", 3GPP TSG RAN WG1 Meeting #70bis, San Diego, USA Oct. 8-12, 2012, Agenda Item 7.4.4.1, R1-124280, server date Sep. 29, 2012; downloaded by EPO on Dec. 22, 2012.

Samsung, "Further details of reference process configuration and CSI multiplexing ", 3GPP TSG RAN WG1 #70bis, Qingdao, China, Oct. 8-12, 2012, Agenda Item 7.4.4.1, R1-124373, server date Sep. 29, 2012; downloaded by EPO on Dec. 22, 2012.

Russian Office Action dated Oct. 12, 2016, from related application No. 2015120615.

International Search Report dated Nov. 7, 2013, from related international application No. PCT/CN2013/082779 (2 pages).

3GPP TSG RAN WG1 Meeting #68bis, Jeju, Korea, Mar. 26-30, 2012, Source: Panasonic, Title: eNB configurations for multiple CSI reporting, Agenda Item: 7.5.5 Donwnlink control signaling for CoMP.

3GPP TSG RAN WG1 Meeting #69, Prague, Czech Republic, May 21-25, 2012, Source: CATT, Title: Periodic CSI reporting for multiple DL CCs in LTE-A Rel-11, Agenda Item: 7.2.1.2.1.

Chinese Office Action dated Aug. 30, 2017, from application No. 201210429813.3.

* cited by examiner

PROCESSING METHOD FOR CHANNEL STATE INFORMATION, BASE STATION AND TERMINAL

CROSS-REFERENCE TO RELATED APPLICATIONS

The present application is a U.S. National Phase of International Patent Application No. PCT/CN2013/082779, filed Sep. 2, 2013, which claims priority from Chinese Patent Application No. 201210429813.3, filed Nov. 1, 2012. The contents of these applications are incorporated herein by reference in their entirety.

TECHNICAL FIELD

The present document relates to a channel state information feedback technology, and in particular, to a method for processing channel state information, a base station and a terminal.

BACKGROUND

After LTE (Long Term Evolution) systems experienced version R8/9/10, a R11 technology is further put forward. At present, partial R8 products start to be gradually commercially used, and R9 and R10 need further product planning.

After experiencing stages of R8 and R9, R10 is added with many new features on the basis of R8 and R9, for example, pilot features such as DMRS (Demodulation Reference Signal), CSI-RS (Channel State Information Reference Signal) and the like, transmission and feedback features such as 8-antenna support, etc. Especially, an eICIC (enhanced Inter-Cell Interference Cancelling) technology considers an inter-cell interference avoiding technology on the basis of considering R8/9 ICIC. Technologies for solving inter-cell interference problems mainly consider cell interference avoidance under homogeneous networks at the beginning of the stage of R10, wherein the eICIC technology and a CoMP (Coordinated Multi-point) technology are mainly considered. Just as the name implies, the CoMP refers to that multiple nodes coordinate to transmit data to one or a plurality of UE under the same time frequency resource or different time frequency resources. This technology can reduce the inter-cell interference, improve the throughput rate of cell edges and expand the cell coverage. However, in consideration of more scenarios to be introduced into heterogeneous networks at the later discussion stage, the complexity of the CoMP technology and the time limit of discussion about R10, finally it is decided not to introduce additional CoMP standardization contents at the state of R10. However, CSI-RS can be designed in consideration of partial demands of CoMP and thus the CoMP technology is not discussed more deeply after the 60bis meeting.

At the SI (Study Item) of the early discussion stage of R11, uniform evaluation architecture is determined mainly by planning scenarios and various CoMP transmission technologies, and two stages of CoMP evaluation are carried out to demonstrate that the CoMP technology can obtain obvious performance gains. According to the CoMP SI conclusion which is recently completed, further studies need to be carried out to JT (Joint Transmission), DPS (Dynamic Point Selection), CS (Coordinated Scheduling) and CB (Coordinated Beamforming) in the CoMP technology.

Before studies are carried out to various CoMP technologies, it needs to firstly consider the differences of the CoMP technology with respect to R8/9/10, including how the CoMP control signaling supports the notification of CoMP measurement sets, how to support the demands of different CoMP transmission technologies, and how UE measure and report CSI (Channel State Information) of a plurality of nodes, wherein how UE measure and report CSI of a plurality of nodes is one of primary problems needed to be solved by the CoMP technology. According to current discussion, feedback of CoMP can be mainly divided into periodic feedback and aperiodic feedback, and aggregate channel information feedback and non-aggregate channel information feedback. The so-called aggregate channel information feedback refers to that channel information of a plurality of nodes is aggregated into channel information of one node for global feedback. For example, if a measurement set includes two nodes, channel information of node 1 is H1 and channel information of node 2 is H2, and at this moment, the UE firstly aggregate the channel information of the two nodes into a piece of big channel information H=[H1; H2] and then measurement related calculation and feedback are performed. Non-aggregate channel information feedback can be further divided into independent single-cell feedback and independent single-cell feedback plus inter-cell correction information. The so-called independent single-cell feedback refers to that measurement related calculation and feedback are independently performed according to the channel information of each node. The so-called independent single-cell feedback plus inter-cell correction information refers to that measurement related calculation is independently performed according to the channel information of each node, phase and/or amplitude information between nodes are calculated and fed back. For aggregate channel information, feedback of an aggregate CQI (Channel Quality Indicator) is included therein, and the aggregate CQI refers to that a CQI fed back by the UE side is an aggregate CQI measured corresponding to one or a plurality of pieces of CSI-RS configuration information, the UE find time frequency locations of corresponding CSI-RS by using a plurality of pieces of CSI-RS configuration information, thus measurement is performed to obtain precoding weight information and calculation is performed by using interference information obtained through other pilot frequency, and at this moment, suppose that data are transmitted to the UE by nodes corresponding to one or a plurality of pieces of CSI-RS configuration information, so as to obtain a CQI value corresponding to joint transmission performed by the plurality of nodes. Since one aggregate CQI may correspond to one or a plurality of pieces of CSI-RS configuration information for aggregation of measurement, for example, a measurement set possibly includes three pieces of CRS-RS configuration information, and at this moment, there are three possibilities to aggregate one piece of CSI-RS configuration information, three possibilities to aggregate two pieces of CSI-RS configuration information, one possibility to aggregate three pieces of CSI-RS configuration information, and totally there are seven possibilities. Therefore, there are multiple possibilities to aggregate the CQI and no possibility can be called an aggregate possibility.

For traditional R8/R9/R10 subscribers, since only the CSI of a serving cell needs to be fed back, the capacity of a single cell only needs to be considered for periodic feedback and aperiodic feedback on the same carriers, and especially for a PUCCH (Physical Uplink Control Channel), optimization of the feedback of a single cell is only needed. At present, in consideration of coding, HARQ (Hybrid Adaptive Request Retransmission) bit number, etc., for one UE, the maximum bit number of CSI feedback supported in a PUCCH uplink sub-frame is eleven. For the composition of the 11 bits, at most 4 bits of PMI (Precoding Matrix Indicator) and 7 bits of CQI (Channel Quality Indicator) in two code words can be considered (differential feedback of CQI between different code words is considered). Since CSI feedback of a plurality of cells needs to be considered in the CoMP technology, a PUCCH capacity of N*11 bits is required. However, the current PUCCH capacity cannot meet this requirement and thus a set of reasonable feedback solutions is needed to solve the problem that the PUCCH capacity is not enough. What can be easily conceived is to compress feedback signaling, but the CoMP technology has a higher requirement on the precision of CSI, especially JT and even JT-MU attach a higher requirement on the precision of CSI, thus the performance loss caused by compression may cause decrease of CoMP performance gains. Another possible consideration is to improve the capacity of the PUCCH, the feedback type of the PUCCH needs to be redesigned and thus it is bound to bring greater standardization efforts. If it is considered that the CSI feedback requirements are different between different modes of CoMP and adaptive switching of different modes possibly needs to be guaranteed, this feedback design may be more complex. Therefore, it is considered in discussion to introduce inter-node information that can guarantee flexible switching of coordinated transmission modes and/or a concept of aggregate CQI. In a recent meeting, it was discussed that the aggregate CQI can obtain performance similar to that obtained by introducing inter-node information and aggregate CQI, and the feedback of additional inter-node information is not introduced at this moment, and at present, whether to introduce the feedback of inter-node information is still under discussion in meetings. However, the introduction of the concept of aggregate CQI is considered in both the above two solutions. For the concept of aggregate CQI, it is to feed back a CQI value generated by aggregation of a plurality of nodes, and the number of aggregated nodes therein can be a combination of any number of nodes of all nodes in a measurement set. For example, if a measurement set includes six nodes, and at this moment, the possible combinations include sixty-three situations; and if the limitation of the maximum aggregated node numbers is considered, and at this moment, the combinations include forty-one possibilities. If UE feeds back once or a plurality of sub-frames feed back a plurality of aggregate CQIs of various situations, a base station side needs to know a combination of which nodes is fed back by the UE, and this point needs to be uniformly regulated on both the base station side and the UE side. Otherwise, the base station side cannot know which nodes the received fed-back aggregate CQI is the combination of.

Feedback for R10 can be mainly divided into periodic feedback and aperiodic feedback.

For aperiodic feedback, uplink authorization or random access authorization control signaling is needed to trigger the aperiodic feedback. Aperiodic feedback modes, as shown in Table 1, can be divided into the following types:

TABLE 1

Aperiodic feedback modes

| | | PMI feedback type | | |
|---|---|---|---|---|
| | | No PMI | Single PMI | Multiple PMI |
| PUSCH CQI feedback type | Wideband Wideband CQI | | | Mode 1-2 |
| | UE Selected (Sub-band CQI) | | Mode 2-0 | Mode 2-2 |
| | Higher Layer-configured (Sub-band CQI) | Mode 3-0 | Mode 3-1 | |

Aperiodic report modes are configured to the terminal side via high-layer signaling eqi-ReportModeAperiodic.

Only when the base station side configures the terminal side to adopt transmission modes 3, 4, 8 and 9 and have a preceding matrix indicator (PMI)/(rank indicator) RI feedback configuration does an RI need to be fed back. For a wideband feedback mode 1-2, the terminal side needs to feed back a plurality of sub-band PMIs and a wideband CQI calculated based on the plurality of PMIs; for higher layer-configured sub-band CQIs, a mode 3-0 and a mode 3-1 are included; for the mode 3-0, the terminal side needs to feed back a wideband CQI and a plurality of sub-band CQIs, and both the wideband CQI and the sub-band CQIs are calculated based on code words: for the transmission mode 3, the calculation of CQI needs to consider different RI values; and for the transmission modes other than the mode 3, the CQI is calculated by supposing RI=1. For the mode 3-1, the terminal side needs to feed back a wideband PMI and then respectively calculate and feed back a wideband CQI and a plurality of sub-band CQIs according to the fed-back wideband PMI, wherein for transmission modes 4, 8 and 9, the calculated value of the CQI needs to be determined based on the values of RI; and for other transmission modes, the calculated value of the CQI is determined according to RI=1. For the sub-band CQIs of the mode 3-0 and mode 3-1, differential feedback is adopted. For UE selected sub-band feedback, a mode 2-0 and a mode 2-2 are included. For the mode 2-0, the terminal side needs to feed back a CQI shared by M Perfer sub-bands and a wideband CQI; for the transmission mode 3, the calculation of the CQI needs to consider different RI values; and for the transmission modes other than the mode 3, the CQI is calculated by supposing RI=1. For the mode 2-2, the terminal side needs to feed back a PMI of M Prefer sub-bands and a PMI of one wideband, and further needs to feed back a CQI of M Prefer sub-bands (calculated based on a PMI of M Prefer sub-bands) and a wideband CQI (calculated based on a PMI of one wideband).

Periodic feedback modes are semi-statically configured by a higher layer, and as shown in Table 2, can be divided into the following types:

TABLE 2

Periodic feedback mode

| | | PMI feedback mode | |
|---|---|---|---|
| | | No PMI | Single PMI |
| PUCCH CQI feedback mode | Wideband (Wideband CQI) | Mode 1-0 | Mode 1-1 |
| | UE Selected (Sub-band CQI) | Mode 2-0 | Mode 2-1 |

For a terminal which is in a transmission mode 9 and is configured with eight CSI-RS antenna ports, a mode 1-1 can be divided into a sub-mode 1 and a sub-mode 2, and different sub-modes are configured via higher layer signaling PUCCH_format1-1_CSI_reporting_mode.

For periodic feedback, different feedback periods and sub-frame offset feedback types can be distinguished by classification as follows:

Type 1: reporting UE selected sub-band CQI;
Type 1a: reporting sub-band CQI and second PMI;
Type 2, Type 2b and Type 2c: reporting wideband CQI and PMI;
Type 2a: reporting wideband PMI feedback;
Type 3: reporting RI;
Type 4: reporting wideband CQI;
Type 5: reporting RI and wideband PMI;
Type 6: reporting RI and precoding matrix indicator (PTI).

Wideband feedback modes include a mode 1-0 and a mode 1-1, wherein the mode 1-1 can be further divided into a sub-mode 1 and a sub-mode 2. For the mode 1-0, the terminal side feeds back an RI of Type 3 and a wideband CQI of Type 4 for the transmission mode 3. For the mode 1-1, in addition to that eight CSI-RS ports are configured in the transmission mode 9, an RI of Type 3 and wideband CQIs and wideband PMIs of Type 2 are fed back in other transmission modes. For the sub-mode 1 of the mode 1-1 in which eight CSI-RS ports are configured in the transmission mode 9, the terminal side feeds back a joint code of an RI of Type 5 and a first wideband PMI and a joint code of a wideband CQI of Type 2b and a second wideband PMI. For the sub-mode 2 of the mode 1-1 in which eight CSI-RS ports are configured in the transmission mode 9, the terminal side feeds back an RI of Type 3 and a joint code of a wideband CQI of Type 2c, a first wideband PMI and a second wideband PMI. For UE selected sub-band CQIs, a mode 2-0 and a mode 2-1 are included. For the mode 2-0, the terminal side reports an RI of Type 3, a wideband CQI of Type 4 and a sub-band CQI of Type 1 in partial bandwidth for the transmission mode 3. For the transmission mode 2-1, in addition to that eight CSI-RS ports are configured in the transmission mode 9, an RI of Type 3, a joint code of wideband CQI and MPI of Type 2 and a sub-band CQI of Type 1 in partial bandwidth are fed back in other transmission modes. For the mode 2-1 in which eight CSI-RS ports are configured in the transmission mode 9, a joint code of a PTI and an RI of Type 6 is fed back. Then a feedback mode is further selected according to the value of the PTI; when PTI=0, a first PMI of wideband of Type 2a is fed back and then a joint code of a CQI of Type 2b wideband and a second wideband PMI is fed back; and when PTI=1, a joint code of a wideband CQI of Type 2b and a second wideband PMI is feedback, and then a joint code of a sub-band CQI of 1a and a second sub-band PMI is fed back.

In consideration that UE needs to feed back channel state information of a plurality of CSI-RS resources in the CoMP technology of R11, the UE shall feed back a plurality of pieces of CSI according to certain feedback rules, wherein in consideration of feedback rules, on one hand, it needs to be considered to reduce uplink feedback overhead as much as possible, and on the other hand, it needs to be considered to perform feedback by using a uniform mode as simple as possible to reduce possible collision probability during information feedback. However, at present, since feedback rules for CSI are still under discussion, there is no related technology for reference.

SUMMARY

The embodiments of the present document provide a method for processing channel state information, a base station and a terminal, so as to solve the problem that there is no feedback rules for UE to perform feedback of a plurality of pieces of CSI at present.

The embodiments of the present document provide a method for processing channel state information (CSI), comprising:

a base station configuring a plurality of CSI processes for a terminal, each CSI process at least including information of a channel measurement part and information of an interference measurement part;

when the base station configures corresponding CSI reference processes for partial or all CSI processes, at least limiting a rank indicator (RI) of the CSI processes for calculating a CSI report to be consistent with an RI of the CSI reference processes by configuring the CSI reference processes; and for the CSI processes configured with the CSI reference processes, the base station receiving a CSI report of the CSI processes according to the RI, or the RI and a precoding type indicator (PTI), or the RI and a precoding matrix indicator (PMI0) corresponding to the CSI reference processes.

Preferably, the method further comprises:

when collision of the RI, or the RI and PTI, or the RI and PMI0 corresponding to the plurality of CSI processes configured by the base station occurs on partial or all sub-frames to result in discarding, the base station receiving a CSI report of the CSI processes according to the RI, or the RI and PTI, or the RI and PMI0 of the CSI reference processes corresponding to the CSI processes.

Preferably, the RI and PTI refers to a configuration situation that the RI and the PTI are transmitted on the same sub-frame; and the RI and PMI0 refers to a configuration situation that the RI and the PMI0 are jointly encoded on a same sub-frame for transmission.

Preferably, when the base station configures corresponding CSI reference processes for partial or all CSI processes, at least limiting the RI of the CSI processes for calculating a CSI report to be consistent with the fed-back RI of the CSI reference processes by configuring the CSI reference processes, comprises:

when the base station configures a corresponding CSI reference process for a current CSI process, the CSI process being configured with the same feedback mode and/or feedback type as the corresponding CSI reference process; or when the base station configures a corresponding CSI reference process and periodic feedback for a current CSI process, the current CSI process being configured with the same feedback mode and/or feedback type as the corresponding CSI reference process; or when the base station configures a corresponding CSI reference process for a current CSI process, the number of ports for non-zero power (NZP) channel state information reference signals (CSI-RS) of the CSI process and the corresponding CSI reference process is eight, and both are configured with RI feedback, the current CSI process being configured with the same feedback mode and/or feedback type as the corresponding CSI reference process; or when the base station configures a corresponding CSI reference process for a current CSI process, the number of ports for NZP CSI-RS of the CSI process and the CSI reference process is eight, and both are configured with RI feedback and periodic feedback, the current CSI process being configured with the same feedback mode and/or feedback type as the corresponding CSI reference process; or when the base station configures a corresponding CSI reference process for a current CSI process, the number of ports for the NZP CSI-RS of the CSI process and the CSI reference process is eight, and both are configured with RI feedback and a sub-mode 1 of a physical uplink control channel (PUCCH) mode 1-1 or a PUCCH mode 2-1 of periodic feedback, the current CSI process being configured with the same feedback mode and/or feedback type as the corresponding CSI reference process; or when the base station configures CSI reference processes only for CSI processes configured as aperiodic feedback, the CSI processes configured as aperiodic feedback being configured with the same feedback mode and/or feedback type as the corresponding CSI reference processes; or when the base station configures CSI reference processes only for CSI processes configured as aperiodic feedback and the CSI reference processes are also CSI processes of aperiodic feedback, the CSI processes configured as aperiodic feedback being configured with the same feedback mode and/or feedback type as the corresponding CSI reference processes; or when the base station configures a corresponding CSI reference process for a current CSI process and the current CSI process is in a feedback mode 2-1, the corresponding CSI reference process being configured with the same feedback mode and feedback type as the current CSI process; or when the base station configures a corresponding CSI reference process for a current CSI process and the current CSI process is in a sub-mode 1 of a feedback mode 1, the corresponding CSI reference process being configured with the same feedback mode and feedback type as the current CSI process.

Preferably, the method further comprises:

when the base station configures the number of ports for the NZP CSI-RS of the CSI processes respectively as eight, and all are configured with RI feedback and CSI reference processes, and a PUCCH feedback mode is a sub-mode 1 of 1-1 or a PUCCH feedback mode 2-1; or when the base station configures the number of ports for the NZP CSI-RS of the CSI processes respectively as eight, all are configured with RI feedback and CSI reference processes, a PUCCH feedback mode is a sub-mode 1 of 1-1 or a PUCCH feedback mode 2-1, and collision of RI or PTI sub-frames of the CSI processes and of the configured CSI reference processes or collision of RI or PMI0 sub-frames of the CSI processes and of the configured CSI reference processes occurs and results in discarding, the base station configuring the CSI processes and the corresponding CSI reference processes to have the same feedback mode and/or feedback type; or when the base station configures the number of ports for the NZP CSI-RS of the CSI processes respectively as eight, and all are configured with RI feedback, CSI reference processes and periodic feedback; or when the base station configures the number of ports for the NZP CSI-RS of the CSI processes respectively as eight, all are configured with RI feedback, CSI reference processes and periodic feedback, and collision of RI or PTI sub-frames of the CSI processes and of the configured CSI reference processes or collision of RI or PMI0 sub-frames of the CSI processes and of the configured CSI reference processes occurs and results in discarding, the base station configuring the CSI processes and the corresponding CSI reference processes to have the same feedback mode and/or feedback type.

Preferably, when collision of the RI, or the RI and PTI, or the RI and PMI0 corresponding to the CSI processes configured by the base station with sub-frames of other CSI processes occurs on partial or all sub-frames and results in discarding of the sub-frame RI, or RI and PTI, or RI and PMI0 of the CSI processes, the base station receiving the CSI report of the CSI processes according to the RI, or the RI and PTI, or the RI and PMI0 of the CSI reference processes corresponding to the CSI processes, comprises:

when the CSI reference processes and non-CSI reference processes feed back that collision of sub-frames of the RI, or the RI and PTI, or the RI and PMI0 of CSI occurs and results in discarding of the sub-frame RI, or RI and PTI, or RI and PMI0 of the CSI processes, the base station receiving the CSI report of the CSI processes corresponding to the CSI reference processes preferentially according to the RI, or the RI and PTI, or the RI and PMI0 corresponding to the CSI reference processes; or when a collision occurs and results in discarding, when collision of the RI, or the PTI and RI, or the RI and PMI0 corresponding to the CSI reference processes with other CSI processes occurs and results in discarding, the base station receiving the CSI report of the CSI processes corresponding to the CSI reference processes according to the RI, or the RI and PTI, or the RI and PMI0 corresponding to the last fed-back CSI reference process; or when collision of RI sub-frames of the CSI reference processes with RI or PTI joint coding sub-frames of the CSI processes corresponding to the CSI reference processes occurs and results in discarding, the base station receiving the CSI report of the CSI processes corresponding to the CSI reference processes according to the RI of the CSI reference processes and the last fed-back PTI or PTI=0 or PTI=1; or when collision of RI sub-frames of the CSI reference processes with RI or PMI0 joint coding sub-frames of the CSI processes corresponding to the CSI reference processes occurs and results in discarding, the base station receiving the CSI report of the CSI processes corresponding to the CSI reference processes according to the RI corresponding to the CSI reference processes and the last fed-back PMI0 of the CSI processes; or when collision of RI or PTI joint coding sub-frames of the CSI reference processes with RI or PTI joint coding sub-frames of the CSI processes corresponding to the CSI reference processes occurs and results in discarding, the base station receiving the CSI report of the CSI processes according to the RI or PTI corresponding to the CSI reference processes; or when collision of RI or PTI joint coding sub-frames of the CSI reference processes with RI or PTI joint coding sub-frames of the CSI processes corresponding to the CSI reference processes occurs and results in discarding, the base station receiving the CSI report of the CSI processes according to the RI corresponding to the CSI reference processes and the last fed-back PTI, the CSI report comprising a PMI and/or a channel quality indicator (CQI); or when collision of RI or PMI0 joint coding sub-frames of the CSI reference processes with RI or PMI0 joint coding sub-frames of the CSI processes corresponding to the CSI reference processes occurs and results in discarding, the base station receiving the CSI report of the CSI processes according to the RI or CQI corresponding to the CSI reference processes, the CSI report comprising a PMI and/or a CQI; or when collision of RI or PTI joint coding sub-frames of the CSI reference processes with RI or PMI0 joint coding sub-frames of the CSI processes corresponding to the CSI reference processes occurs and results in discarding, the base station receiving the CSI report of the CSI processes according to the RI corresponding to the CSI reference processes and the last fed-back PMI0, the CSI report comprising a PMI and/or a CQI; or when collision of RI or PMI0 joint coding sub-frames of the CSI reference processes with RI or PMI0 joint coding sub-frames of the CSI processes corresponding to the CSI reference processes occurs and results in discarding, the base station receiving the CSI report of the CSI processes according to the RI corresponding to the CSI reference processes and the last fed-back PTI or PTI=0 or PTI=1; or when collision of the RI corresponding to the CSI reference processes with other CSI processes occurs and results in discarding, the base station receiving the CSI report of the CSI reference processes according to the RI corresponding to the last fed-back CSI reference process, and receiving the CSI report of the CSI processes according to an RI calculated by a current sub-frame; or when collision of the RI corresponding to the CSI reference processes with other CSI processes occurs and results in discarding, the base station receiving the CSI report of the CSI reference processes according to the RI corresponding to the last fed-back CSI reference process or the RI fed back by the CSI processes corresponding to the CSI reference processes.

The embodiments of the present document further provide a method for processing channel state information (CSI), comprising:

a terminal acquiring CSI processes from a base station, and when part or all of the CSI processes are configured with CSI reference processes, the terminal calculating a CSI report of the CSI processes configured with the CSI reference processes according to a rank indicator (RI), or the RI and a precoding type indicator (PTI), or the RI and a precoding matrix indicator (PMI0) corresponding to the CSI reference processes.

Preferably, the method further comprises: when collision of the RI, or the RI and PTI, or the RI and PMI0 corresponding to a plurality of CSI processes fed back by the terminal occurs on partial or all sub-frames and results in discarding, calculating the CSI report corresponding to the CSI processes according to the RI, or the RI and PTI, or the RI and PMI0 of the corresponding CSI reference processes.

Preferably, the CSI report comprises one or more of the following contents: PMI, CQI, PMI0 and PMI1.

Preferably, the method further comprises:

when a CSI process of the terminal is configured with a corresponding CSI reference process, the terminal determining that the CSI process and the CSI reference process have the same feedback mode and/or feedback type; or when a CSI process of the terminal is configured with a corresponding CSI reference process and periodic feedback, the terminal determining that the CSI process and the CSI reference process have the same feedback mode and/or feedback type; or when the number of ports for non-zero power (NZP) channel state information reference signals (CSI-RS) of CSI reference processes and CSI processes configured with the CSI reference processes is respectively configured as eight, and all are configured with RI feedback, the terminal determining that the CSI processes and the CSI reference processes have the same feedback mode and/or feedback type; or when the number of ports for NZP CSI-RS of CSI reference processes and CSI processes configured with the CSI reference processes is respectively configured as eight, and all are configured with RI feedback and periodic feedback, the terminal determining that the CSI processes and the CSI reference processes have the same feedback mode and/or feedback type; or when the number of ports for NZP CSI-RS of CSI processes is respectively configured as eight, and all are configured with RI feedback and CSI reference processes, and a physical uplink control channel (PUCCH) feedback mode is a sub-mode 1 of 1-1 or a PUCCH feedback mode 2-1; or when the number of ports for NZP CSI-RS of CSI processes is respectively as eight, all are configured with RI feedback and CSI reference processes, a PUCCH feedback mode is a sub-mode 1 of 1-1 or a PUCCH feedback mode 2-1, and collision of RI or PTI sub-frames or RI or PMI0 sub-frames of the CSI processes and the configured CSI reference processes occurs and results in discarding, the terminal determining that the CSI processes and the CSI reference processes have the same feedback mode and/or feedback type; or when the terminal is configured as aperiodic feedback, the terminal determining that the configured CSI reference processes are effective to the corresponding CSI processes; or when the terminal is configured as aperiodic feedback and the corresponding CSI reference processes are also CSI processes of aperiodic feedback, the terminal determining that the configured CSI reference processes are effective to the corresponding CSI processes; or when a CSI process of the terminal is configured with a corresponding CSI reference process and the CSI process is in a feedback mode 2-1, the terminal determining that the CSI reference process and the CSI process have the same feedback mode and/or feedback type; or when a CSI process of the terminal is configured with a corresponding CSI reference process and the CSI process is in a sub-mode 1 of a feedback mode 1, the terminal determining that the CSI reference process and the CSI process have the same feedback mode and/or feedback type.

Preferably, when collision of the RI, or the RI and PTI, or the RI and PMI0 corresponding to a plurality of CSI processes fed back by the terminal occurs on partial or all sub-frames and results in discarding, calculating the CSI report corresponding to the CSI processes according to the RI, or the RI and PTI, or the RI and PMI0 of the corresponding CSI reference processes, comprises:

when the CSI reference processes and non-CSI reference processes feed back that collision of sub-frames of the RI, or the RI and PTI, or the RI and PMI0 of CSI occurs and results in discarding, the terminal preferentially feeding back the RI, or the RI and PTI, or the RI and PMI0 corresponding to the CSI reference processes; or when the CSI reference processes and the CSI processes corresponding to the CSI reference processes feed back that collision of sub-frames of the RI, or the RI and PTI, or the RI and PMI0 occurs and results in discarding, the terminal preferentially feeding back the RI, or the RI and PTI, or the RI and PMI0 corresponding to the CSI reference processes; or when an index priority of CSI reference processes is lower than that of the CSI processes corresponding to the CSI reference processes, and both feed back that collision of the sub-frames of the RI, the RI and PTI or the RI and PMI0 occurs and results in discarding, the terminal preferentially feeding back the RI, or the RI and PTI, or the RI and PMI0 corresponding to the CSI reference processes, or limiting that the index priority of the CSI reference processes must be higher than that of the CSI processes; or when collision of the RI, the RI or PTI, or the RI or PMI0 corresponding to the CSI reference processes with other CSI processes occurs and results in discarding, calculating CSI reports of the CSI reference processes and the CSI processes corresponding to the CSI reference processes according to the RI, or the RI and PTI, or the RI and PMI0 of the last fed-back CSI reference process; or when collision of RI sub-frames of the CSI reference processes with RI or PTI joint coding sub-frames of the CSI processes corresponding to the CSI reference processes occurs and results in discarding, the terminal calculating the CSI report of the CSI processes according to the RI of the CSI reference processes and the last fed-back PTI or PTI=0 or PTI=1, and feeding back the RI of the CSI reference processes; or when collision of RI sub-frames of the CSI reference processes with RI or PMI0 joint coding sub-frames of the CSI processes corresponding to the CSI reference processes occurs and results in discarding, the terminal calculating the CSI report of the CSI processes according to the RI of the CSI reference processes and the PMI0 last fed back by the CSI processes, and feeding back the RI of the CSI reference processes; or when collision of RI or PTI joint coding sub-frames of the CSI reference processes and of the CSI processes corresponding to the CSI reference processes occurs and results in discarding, the terminal calculating the CSI report of the CSI processes according to the RI or PTI of the CSI reference processes, and feeding back the RI or PTI of the CSI reference processes and the calculated CSI report; or when collision of RI or PTI joint coding sub-frames of the CSI reference processes and of the CSI processes corresponding to the CSI reference processes occurs and results in discarding of the sub-frames of the CSI processes, the terminal calculating the CSI report according to the RI of the CSI reference processes and the last fed-back PTI, and feeding back the RI or PTI of the CSI reference processes and the calculated CSI report, the CSI report comprising a PMI and/or a channel quality indicator (CQI); or when collision of RI or PMI0 joint coding sub-frames of the CSI reference processes and of the CSI processes corresponding to the CSI reference processes occurs and results in discarding, the terminal calculating the CSI report according to the RI or PMI0 of the CSI reference processes, and feeding back the RI or PMI0 of the CSI reference processes and the calculated CSI report, the CSI report comprising a PMI and/or a CQI; or when collision of RI or PTI joint coding sub-frames of the CSI reference processes with RI or PMI0 joint coding sub-frames of the CSI processes corresponding to the CSI reference processes occurs and results in discarding, the terminal calculating the CSI report of the CSI processes according to the RI of the CSI reference processes and the last fed-back PMI0, and feeding back the RI or PTI of the CSI reference processes and the calculated CSI report, the CSI report comprising a PMI and/or a CQI; or when collision of RI or PMI0 joint coding sub-frames of the CSI reference processes and of the CSI processes corresponding to the CSI reference processes occurs and results in discarding, the terminal calculating the CSI report of the CSI processes according to the RI of the CSI reference processes and the last fed-back PTI or PTI-=0 or PTI=1, and feeding back the RI or PTI of the CSI reference processes and the calculated CSI report; or when collision of the RI corresponding to the CSI reference processes with other CSI processes occurs and results in discarding, the terminal calculating and feeding back the CSI report of the CSI reference processes according to the RI of the last fed-back CSI reference process, and calculating and feeding back the CSI report of the CSI processes corresponding to the CSI reference processes according to an RI calculated by a current sub-frame; or when collision of the RI corresponding to the CSI reference processes with other CSI processes occurs and results in discarding, the terminal calculating and feeding back CSI of the CSI reference processes according to the RI of the last fed-back CSI reference process or the RI fed back by the CSI processes corresponding to the CSI reference processes.

Preferably, when part or all of the CSI processes are configured with CSI reference processes, the terminal calculating the CSI report of the CSI processes configured with the CSI reference processes according to the RI, or the RI and PTI, or the RI and PMI0 corresponding to the CSI reference processes, comprises:

when a CSI process of the terminal is configured with a corresponding CSI reference process, the terminal updating the PMI and the CQI according to the RI of the corresponding CSI reference process.

Preferably, the terminal updating the PMI and the CQI according to the RI of the corresponding CSI reference process comprises:

the terminal calculating and updating the PMI and the CQI according to the RI fed back by the last CSI reference process on PMI or PMI0 feedback sub-frames of the CSI process; or the terminal calculating and updating the PMI and the CQI according to the RI fed back by the last CSI reference process on RI feedback sub-frames of the CSI process.

The embodiments of the present document further provides a base station, comprising:

a configuration module, set to: configure a plurality of CSI processes for a terminal, each CSI process at least comprising information of a channel measurement part and information of an interference measurement part; and a receiving module, set to: when the base station configures corresponding CSI reference processes for partial or all CSI processes, at least limit a rank indicator (RI) of the CSI processes for calculating a CSI report to be consistent with an RI of the CSI reference processes by configuring the CSI reference processes; and for the CSI processes configured with CSI reference processes, according to the RI, or the RI and a precoding type indicator (PTI), or the RI and a precoding matrix indicator (PMI0) corresponding to the CSI reference processes, receive a CSI report of the CSI processes.

Preferably, the receiving module is further set such that: when collision of the RI, or the RI and PTI, or the RI and PMI0 corresponding to the plurality of CSI processes configured by the base station occurs on partial or all sub-frames and results in discarding, the base station receives the CSI report of the CSI processes according to the RI, or the RI and PTI, or the RI and PMI0 of the CSI reference processes corresponding to the CSI processes.

Preferably, the RI and PTI refers to a configuration situation that the RI and the PTI are transmitted on the same sub-frame; and the RI and PMI0 refers to a configuration situation that the RI and the PMI0 are jointly encoded on a same sub-frame for transmission.

Preferably, the receiving module is set such that:

when the base station configures a corresponding CSI reference process for a current CSI process, the CSI process is configured with the same feedback mode and/or feedback type as the corresponding CSI reference process; or when the base station configures a corresponding CSI reference process and periodic feedback for a current CSI process, the current CSI process is configured with the same feedback mode and/or feedback type as the corresponding CSI reference process; or when the base station configures a corresponding CSI reference process for a current CSI process, the number of ports for non-zero power (NZP) channel state information reference signals (CSI-RS) of the CSI process and the corresponding CSI reference process is eight, and both are configured with RI feedback, the current CSI process is configured with the same feedback mode and/or feedback type as the corresponding CSI reference process; or when the base station configures a corresponding CSI reference process for a current CSI process, the number of ports for NZP CSI-RS of the CSI process and the CSI reference process is eight, and both are configured with RI feedback and periodic feedback, the current CSI process is configured with the same feedback mode and/or feedback type as the corresponding CSI reference process; or when the base station configures a corresponding CSI reference process for a current CSI process, the number of ports for the NZP CSI-RS of the CSI process and the CSI reference process is eight, and both are configured with RI feedback and a sub-mode 1 of a physical uplink control channel (PUCCH) mode 1-1 or a PUCCH mode 2-1 of periodic feedback, the current CSI process is configured with the same feedback mode and/or feedback type as the corresponding CSI reference process; or when the base station configures CSI reference processes only for CSI processes configured as aperiodic feedback, the CSI processes configured as aperiodic feedback are configured with the same feedback mode and/or feedback type as the corresponding CSI reference processes; or when the base station configures CSI reference processes only for CSI processes configured as aperiodic feedback and the CSI reference processes are also CSI processes of aperiodic feedback, the CSI processes configured as aperiodic feedback are configured with the same feedback mode and/or feedback type as the corresponding CSI reference processes; or when the base station configures a corresponding CSI reference process for a current CSI process and the current CSI process is in a feedback mode 2-1, the corresponding CSI reference process is configured with the same feedback mode and feedback type as the current CSI process; or when the base station configures a corresponding CSI reference process for a current CSI process and the current CSI process is in a sub-mode 1 of a feedback mode 1, the corresponding CSI reference process is configured with the same feedback mode and feedback type as the current CSI process.

Preferably, the receiving module is further set such that:

when the base station configures the number of ports for the NZP CSI-RS of the CSI processes respectively as eight, all are configured with RI feedback and CSI reference processes, and a PUCCH feedback mode is a sub-mode 1 of 1-1 or a PUCCH feedback mode 2-1; or when the base station configures the number of ports for the NZP CSI-RS of the CSI processes respectively as eight, all are configured with RI feedback and CSI reference processes, a PUCCH feedback mode is a sub-mode 1 of 1-1 or a PUCCH feedback mode 2-1, and collision of RI or PTI sub-frames of the CSI processes and of the configured CSI reference processes or collision of RI or PMI0 sub-frames of the CSI processes and of the configured CSI reference processes occurs and results in discarding, the base station configures the CSI processes and the corresponding CSI reference processes to have the same feedback mode and/or feedback type; or when the base station configures the number of ports for the NZP CSI-RS of the CSI processes respectively as eight and all are configured with RI feedback, CSI reference processes and periodic feedback; or when the base station configures the number of ports for the NZP CSI-RS of the CSI processes respectively as eight, all are configured with RI feedback, CSI reference processes and periodic feedback, and collision of RI or PTI sub-frames of the CSI processes and of the configured CSI reference processes or collision of RI or PMI0 sub-frames of the CSI process and of the configured CSI reference processes occurs and results in discarding, the base station configures the CSI processes and the corresponding CSI reference processes to have the same feedback mode and/or feedback type.

Preferably, the receiving module is set to:

when the CSI reference processes and non-CSI reference processes feed back that collision of sub-frames of the RI, or the RI and PTI, or the RI and PMI0 of CSI occurs and results in discarding, receive the CSI report of the CSI processes corresponding to the CSI reference processes preferentially according to the RI, or the RI and PTI, or the RI and PMI0 corresponding to the CSI reference processes; or when the CSI reference processes and the CSI processes corresponding to the CSI reference processes feed back that collision of sub-frames of the RI, the RI and PTI or the RI and PMI0 occurs and results in discarding, receive the CSI report of the CSI processes corresponding to the CSI reference processes according to the RI, or the RI and PTI, or the RI and PMI0 corresponding to the CSI reference processes; or when an index priority of the CSI reference processes is lower than that of the CSI processes corresponding to the CSI reference processes, and both feed back that collision of sub-frames of the RI, or the RI and PTI, or the RI and PMI0 occurs and results in discarding, receive the CSI report of the CSI processes corresponding to the CSI reference processes according to the RI, or the RI and PTI, or the RI and PMI0 corresponding to the CSI reference processes, or limit that the index priority of the CSI reference processes must be higher than that of the CSI processes corresponding to the CSI reference processes; or when collision of the RI, or the PTI and RI, or the RI and PMI0 corresponding to the CSI reference processes with other CSI processes occurs and results in discarding, receive the CSI report of the CSI processes corresponding to the CSI reference processes according to the RI, or RI and PTI, or RI and PMI0 corresponding to the last fed-back CSI reference process; or when collision of RI sub-frames of the CSI reference processes with RI or PTI joint coding sub-frames of the CSI processes corresponding to the CSI reference processes occurs and results in discarding, receive the CSI report of the CSI processes corresponding to the CSI reference processes according to the RI of the CSI reference processes and the last fed-back PTI or PTI=0 or PTI=1; or when collision of RI sub-frames of the CSI reference processes with RI or PMI0 joint coding sub-frames of the CSI processes corresponding to the CSI reference processes occurs and results in discarding, receive the CSI report of the CSI processes corresponding to the CSI reference processes according to the RI corresponding to the CSI reference processes and the PMI0 last fed-back by the CSI processes; or when collision of RI or PTI joint coding sub-frames of the CSI reference processes with RI or PTI joint coding sub-frames of the CSI processes corresponding to the CSI reference processes occurs and results in discarding, receive the CSI report of the CSI processes according to the RI or PTI corresponding to the CSI reference processes; or when collision of RI or PTI joint coding sub-frames of the CSI reference processes with RI or PTI joint coding sub-frames of the CSI processes corresponding to the CSI reference processes occurs and results in discarding, receive the CSI report of the CSI processes according to the RI corresponding to the CSI reference processes and the last fed-back PTI, the CSI report comprising a PMI and/or a channel quality indicator (CQI); or when collision of RI or PMI0 joint coding sub-frames of the CSI reference processes with RI or PMI0 joint coding sub-frames of the CSI processes corresponding to the CSI reference processes occurs and results in discarding, receive the CSI report of the CSI processes according to the RI or the CQI corresponding to the CSI reference processes, the CSI report comprising a PMI and/or a CQI; or when collision of RI or PTI joint coding sub-frames of the CSI reference processes with RI or PMI0 joint coding sub-frames of the CSI processes corresponding to the CSI reference processes occurs and results in discarding, receive the CSI report of the CSI processes according to the RI corresponding to the CSI reference processes and the last fed-back PMI0, the CSI report comprising a PMI and/or a CQI; or when collision of RI or PMI0 joint coding sub-frames of the CSI reference processes with RI or PMI0 joint coding sub-frames of the CSI processes corresponding to the CSI reference processes occurs and results in discarding, receive the CSI report of the CSI processes according to the RI corresponding to the CSI reference processes and the last fed-back PTI or PTI=0 or PTI=1; or when collision of the RI corresponding to the CSI reference processes with other CSI processes occurs and results in discarding, receive the CSI report of the CSI reference processes according to the last fed-back RI corresponding to the CSI reference processes, and receive the CSI report of the CSI processes according to an RI calculated by a current sub-frame; or when collision of the RI corresponding to the CSI reference processes with other CSI processes occurs and results in discarding, receive the CSI report of the CSI reference processes according to the RI corresponding to the last fed-back CSI reference process or the RI fed back by the CSI processes corresponding to the CSI reference processes.

The embodiments of the present document further provide a terminal, comprising:

an acquisition module, set to: acquire CSI processes from a base station; and a calculation module, set such that: when part or all of the CSI processes acquired by the acquisition module are configured with CSI reference processes, the terminal calculates a CSI report of the CSI processes configured with the CSI reference processes according to a rank indicator (RI), or the RI and a precoding type indicator (PTI), or the RI and a precoding matrix indicator (PMI0) corresponding to the CSI reference processes.

Preferably, the calculation module is further set to: when collision of the RI, or the RI and PTI, or the RI and PMI0 corresponding to a plurality of CSI processes fed back by the terminal occurs on partial or all sub-frames and results in discarding, calculate the CSI report corresponding to the CSI processes according to the RI, or the RI and PTI, or the RI and PMI0 corresponding to the CSI reference processes.

Preferably, the CSI report comprises one or more of the following contents: PMI, CQI, PMI0 and PMI1.

Preferably, the calculation module is further set such that:

when a CSI process of the terminal is configured with a corresponding CSI reference process, the terminal determines that the CSI process and the CSI reference process have the same feedback mode and/or feedback type; or when a CSI process of the terminal is configured with a corresponding CSI reference process and periodic feedback, the terminal determines that the CSI process and the CSI reference process have the same feedback mode and/or feedback type; or when the number of ports for non-zero power (NZP) channel state information reference signals (CSI-RS) of CSI reference processes and CSI processes configured with the CSI reference processes is respectively configured as eight, and all are configured with RI feedback, the terminal determines that the CSI processes and the CSI reference processes have the same feedback mode and/or feedback type; or when the number of ports for NZP CSI-RS of CSI reference processes and CSI processes configured with the CSI reference processes is respectively configured as eight, and all are configured with RI feedback and periodic feedback, the terminal determines that the CSI processes and the CSI reference processes have the same feedback mode and/or feedback type; or when the number of ports for NZP CSI-RS of CSI processes is respectively configured as eight, all are configured with RI feedback and CSI reference processes, and a PUCCH feedback mode is a sub-mode 1 of 1-1 or a PUCCH feedback mode 2-1; or when the number of ports for NZP CSI-RS of CSI processes is respectively configured as eight, all are configured with RI feedback and CSI reference processes, a PUCCH feedback mode is a sub-mode 1 of 1-1 or a PUCCH feedback mode 2-1, and when collision of RI or PTI sub-frames or collision of RI or PMI0 sub-frames of the CSI processes and of the configured CSI reference processes occurs and results in discarding, the terminal determines that the CSI processes and the CSI reference processes have the same feedback mode and/or feedback type; or when the terminal is configured as aperiodic feedback, the terminal determines that the configured CSI reference processes are effective to the corresponding CSI processes; or when the terminal is configured as aperiodic feedback and the corresponding CSI reference processes are also CSI processes of aperiodic feedback, the terminal determines that the configured CSI reference processes are effective to the corresponding CSI processes; or when a CSI process of the terminal is configured with a corresponding CSI reference process and the CSI process is in a feedback mode 2-1, the terminal determines that the CSI reference process and the CSI process have the same feedback mode and/or feedback type; or when a CSI process of the terminal is configured with a corresponding CSI reference process and the CSI process is in a sub-mode 1 of a feedback mode 1, the terminal determines that the CSI reference process and the CSI process have the same feedback mode and/or feedback type.

Preferably, the calculation module is set to:

when sub-frames for feeding back the RI, or the RI and PTI, or the RI and PMI0 of CSI of the CSI reference processes and non-CSI reference processes collide and result in discarding, preferentially feed back the RI, or the RI and PTI, or the RI and PMI0 corresponding to the CSI reference processes; or when sub-frames for feeding back the RI, or the RI and PTI, or the RI and PMI0 of CSI of the CSI reference processes and the CSI processes collide and result in discarding, preferentially feed back the RI, or the RI and PTI, or the RI and PMI0 corresponding to the CSI reference processes; or when an index priority of the CSI reference processes is lower than that of the CSI processes corresponding to the CSI reference processes, and the sub-frames for feeding back the RI, the RI and PTI or the RI and PMI0 of the CSI reference processes and the CSI processes collide and result in discarding, preferentially feed back the RI, or the RI and PTI, or the RI and PMI0 corresponding to the CSI reference processes, or limit that the index priority of the CSI reference processes must be higher than that of the CSI processes; or when collision of the RI, the RI or PTI, or the RI or PMI0 corresponding to the CSI reference processes with other CSI processes occurs and results in discarding, calculate CSI reports of the CSI reference processes and the CSI processes corresponding to the CSI reference processes according to the RI, or the RI and PTI, or the RI and PMI0 of the last fed-back CSI reference process; or when collision of RI sub-frames of the CSI reference processes with RI or PTI joint coding sub-frames of the CSI processes corresponding to the CSI reference processes occurs and results in discarding, calculate the CSI report of the CSI processes according to the RI of the CSI reference processes and the last fed-back PTI or PTI=0 or PTI=1, and feed back the RI of the CSI reference processes; or when collision of RI sub-frames of the CSI reference processes with RI or PMI0 joint coding sub-frames of the CSI processes corresponding to the CSI reference processes occurs and results in discarding, calculate the CSI report of the CSI processes according to the RI of the CSI reference processes and the PMI0 last fed-back by the CSI processes, and feed back the RI of the CSI reference processes; or when collision of RI or PTI joint coding sub-frames of the CSI reference processes and of the CSI processes corresponding to the CSI reference processes occurs and results in discarding, calculate the CSI report of the CSI processes according to the RI or the PTI of the CSI reference processes, and feed back the RI or the PTI of the CSI reference processes and the calculated CSI report; or when collision of RI or PTI joint coding sub-frames of the CSI reference processes and of the CSI processes corresponding to the CSI reference processes occurs and results in discarding, calculate the CSI report according to the RI of the CSI reference processes and the last fed-back PTI, and feed back the RI or the PTI of the CSI reference processes, and the calculated CSI report, the CSI report comprising a PMI and/or a channel quality indicator (CQI); or when collision of RI or PMI0 joint coding sub-frames of the CSI reference processes and of the CSI processes corresponding to the CSI reference processes occurs and results in discarding, calculate the CSI report according to the RI or the PMI0 of the CSI reference processes, and feed back the RI or the PMI0 of the CSI reference processes and the calculated CSI report, the CSI report comprising a PMI and/or a CQI; or when collision of RI or PTI joint coding sub-frames of the CSI reference processes with RI or PMI0 joint coding sub-frames of the CSI processes corresponding to the CSI reference processes occurs and results in discarding, calculate the CSI report of the CSI processes according to the RI of the CSI reference processes and the last fed-back PMI0, and feed back the RI or the PTI of the CSI reference processes and the calculated CSI report, the CSI report comprising a PMI and/or a CQI; or when collision of RI or PMI0 joint coding sub-frames of the CSI reference processes and of the CSI processes corresponding to the CSI reference processes occurs and results in discarding, calculate the CSI report of the CSI processes according to the RI of the CSI reference processes and the last fed-back PTI or PTI=0 or PTI=1, and feed back the RI or the PTI of the CSI reference processes and the calculated CSI report; or when collision of the RI corresponding to the CSI reference processes with other CSI processes occurs and results in discarding, calculate and feed back the CSI report of the CSI reference processes according to the last fed-back RI of the CSI reference processes, and calculate and feed back the CSI report of the CSI processes corresponding to the CSI reference processes according to an RI calculated by a current sub-frame; or when collision of the RI corresponding to the CSI reference processes with other CSI processes occurs and results in discarding, calculate and feed back the CSI of the CSI reference processes according to the last fed-back RI of the CSI reference processes or the RI fed back by the CSI processes corresponding to the CSI reference processes.

Preferably, the calculation module is set to, when a CSI process of the terminal is configured with a corresponding CSI reference process, update the PMI and the CQI according to the RI of the corresponding CSI reference process.

Preferably, the calculation module is set to: calculate and update the PMI and the CQI according to the RI fed back by the last CSI reference process on PMI or PMI0 feedback sub-frames of the CSI process; or calculate and update the PMI and the CQI according to the RI fed back by the last CSI reference process on RI feedback sub-frames of the CSI process.

The embodiments of the present document can realize flexible channel state information configuration and feedback.

PREFERRED EMBODIMENTS OF THE PRESENT DOCUMENT

The embodiments of the present document will be described below in detail in combination with the accompanying drawings. It needs to be stated that, in the case of no conflicting, the embodiments in the present application and the features in the embodiments can be freely combined with one another.

Figure 1:
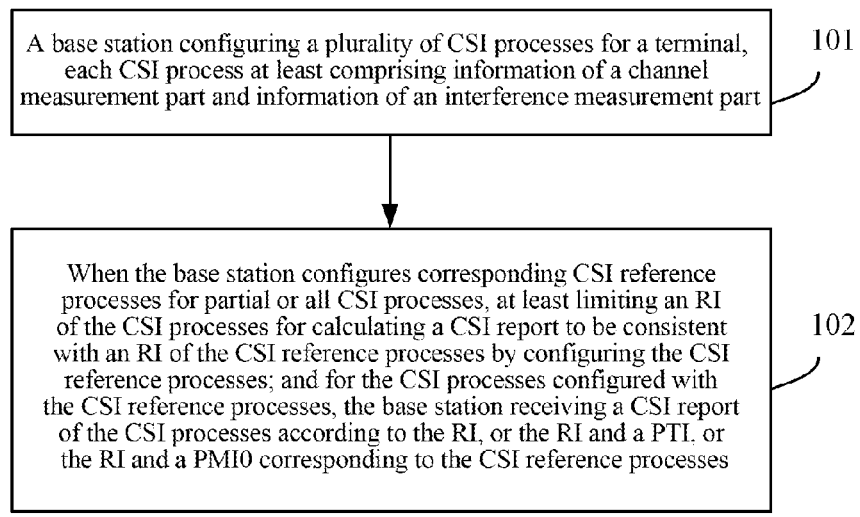
FIG. 1 is a flowchart of embodiment 1 of a method for processing channel state information of the present document.

As shown in FIG. 1, it is a flowchart of embodiment 1 of a method for processing channel state information of the present document, this embodiment is described from a base station side and the method includes:

step 101, a base station configuring a plurality of CSI processes for a terminal, each CSI process at least including information of a channel measurement part and information of an interference measurement part;

step 102, when the base station configures corresponding CSI reference processes for partial or all the CSI processes, at least limiting an RI of the CSI processes for calculating a CSI report to be consistent with an RI of the CSI reference processes by configuring the CSI reference processes; and for the CSI processes configured with the CSI reference processes, the base station receiving a CSI report of the CSI processes according to the RI, or the RI and a PTI, or the RI and a PMI0 corresponding to the CSI reference processes.

Wherein, the RI and PTI refers to a configuration situation that the RI and the PTI are transmitted on a same sub-frame; and the RI and PMI0 refers to a configuration situation that the RI and the PMI0 are jointly coded on a same sub-frame for transmission. The PMI0 mentioned in the embodiments of the present document is a first codebook of dual codebooks during 8-antenna configuration in the standard; when a PUCCH feedback mode is configured as a sub-mode 1 of 1-1, the MPI0 and the RI are fed back by means of jointly coding on a same sub-frame.

In addition, the method further includes:

Step 103: when collision of the RI, or the RI and PTI, or the RI and PMI0 corresponding to the plurality of CSI processes configured by the base station occurs on partial or all sub-frames and results in discarding, the base station receiving the CSI report of the CSI processes according to the RI, or the RI and PTI, or the RI and PMI0 of the CSI reference processes corresponding to the CSI processes.

Figure 2:
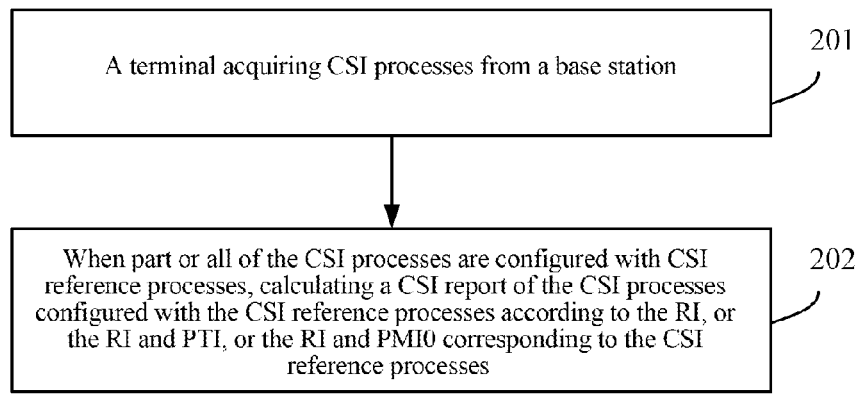
FIG. 2 is a flowchart of embodiment 2 of a method for processing channel state information of the present document.

As shown in FIG. 2, it is a flowchart of embodiment 1 of a method for processing channel state information of the present document, this embodiment is described from a terminal side and the method includes:

step 201: a terminal acquiring CSI processes from a base station;

step 202: when part or all of the CSI processes are configured with CSI reference processes, calculating a CSI report of the CSI processes configured with the CSI reference processes according to an RI, or the RI and a PTI, or the RI and a PMI0 corresponding to the CSI reference processes.

When collision of the RI, or the RI and PTI, or the RI and PMI0 corresponding to a plurality of CSI processes fed back by the terminal occurs on partial or all sub-frames and results in discarding, the CSI report corresponding to the CSI processes is calculated according to the RI, or the RI and PTI, or the RI and PMI0 of the corresponding CSI reference processes.

The CSI report includes one or more of the following contents: PMI, CQI, PMI0 and PMI1.

In addition, the method can further include: when collision of the RI, or the RI and PTI, or the RI and PMI0 corresponding to a plurality of CSI processes fed back by the terminal occurs on partial or all sub-frames and results in discarding, calculating the CSI report corresponding to the CSI processes according to the RI, or the RI and PTI, or the RI and PMI0 corresponding to the CSI reference processes.

The embodiments of the present document are described below in detail from the angle of interaction between the base station side and the terminal side:

Embodiment 1

When the base station configures a CSI process to have a CSI reference process, the CSI process shall be configured with a same feedback mode and/or feedback type as the CSI reference process.

When the terminal supposes that a CSI process has a CSI reference process and all are configured with RI feedback, the CSI process shall have the same feedback mode and/or feedback type as the configured CSI reference process.

Embodiment 2

When the base station configures a CSI process to have a CSI reference process and as periodic feedback, the CSI process shall be configured with the same feedback mode and/or feedback type as the CSI reference process.

When the terminal supposes that a CSI process has a CSI reference process, and is periodic feedback and is configured with RI feedback, the CSI process shall have the same feedback mode and/or feedback type as the configured CSI reference process.

Embodiment 3

When the base station configures a CSI process to have a CSI reference process, a number of ports for non-zero power (NZP) CSI-RS of the CSI process and the CSI reference process is eight, and all are configured with RI feedback, the CSI process shall be configured with the same feedback mode and/or feedback type as the CSI reference process.

When the terminal supposes that a CSI process has a CSI reference process, the number of ports for NZP CSI-RS of the CSI process and the CSI reference process is eight, and all are configured with RI feedback, the CSI process shall be configured with the same feedback mode and/or feedback type as the CSI reference process.

Embodiment 4

When the base station configures a CSI process to have a CSI reference process, the number of ports for NZP CSI-RS of the CSI process and the CSI reference process is eight, and all are configured with RI feedback and periodic feedback, the CSI process shall be configured with the same feedback mode and/or feedback type as the CSI reference process.

When the terminal supposes that a CSI process has a CSI reference process, the number of ports for NZP CSI-RS of the CSI process and the CSI reference process is eight, and all are configured with RI feedback and periodic feedback, the CSI process shall be configured with the same feedback mode and/or feedback type as the CSI reference process.

Embodiment 5

When the base station configures a CSI process to have a CSI reference process, the number of ports for NZP CSI-RS of the CSI process and the CSI reference process is eight, and all are configured with RI feedback and a sub-mode 1 of a PUCCH mode 1-1 or a PUCCH mode 2-1 of periodic feedback, the CSI process shall be configured with the same feedback mode and/or feedback type as the CSI reference process.

When the terminal supposes that a CSI process has a CSI reference process, the number of ports for NZP CSI-RS of the CSI process and the CSI reference process is eight, and all are configured with RI feedback and a sub-mode 1 of a PUCCH mode 1-1 or a PUCCH mode 2-1 of periodic feedback, the CSI process shall be configured with the same feedback mode and/or feedback type as the CSI reference process.

Embodiment 6

When the base station configures the number of ports for NZP CSI-RS of CSI processes respectively as eight, and all are configured with RI feedback and CSI reference processes, and a PUCCH feedback mode is a sub-mode 1 of 1-1 or a PUCCH mode 2-1; or when the base station configures the number of ports for NZP CSI-RS of CSI processes respectively as eight, all are configured with RI feedback and CSI reference processes, a PUCCH feedback mode is a sub-mode 1 of 1-1 or a PUCCH feedback mode 2-1, and collision of RI/PTI sub-frames or RI/PMI0 sub-frames of the CSI processes and the configured CSI reference processes occurs and results in discarding, the CSI processes and the CSI reference processes have the same feedback mode and/or feedback type.

When the number of ports for NZP CSI-RS of CSI processes is respectively configured as eight, all are configured with RI feedback and CSI reference processes, and a PUCCH feedback mode is a sub-mode 1 of 1-1 or a PUCCH mode 2-1; or when the number of ports for NZP CSI-RS of CSI processes is respectively configured as eight, all are configured with RI feedback and CSI reference processes, a PUCCH feedback mode is a sub-mode 1 of 1-1 or a PUCCH feedback mode 2-1, and RI/PTI sub-frames or RI/PMI0 sub-frames of the CSI processes and the configured CSI reference processes collide, the terminal always supposes that the feedback mode and/or feedback type of the CSI reference processes of the CSI processes is the same as the feedback mode and/or feedback type of the CSI processes.

Embodiment 7

When the base station configures the number of ports for NZP CSI-RS of CSI processes respectively as eight, all are configured with RI feedback and CSI reference processes, and a PUCCH feedback mode is a sub-mode 1 of 1-1 or a PUCCH mode 2-1; or when the number of ports for NZP CSI-RS of CSI processes is respectively configured as eight, all are configured with RI feedback and CSI reference processes, a PUCCH feedback mode is a sub-mode 1 of 1-1 or a PUCCH feedback mode 2-1, and RI/PTI sub-frames or RI/PMI0 sub-frames of the CSI processes and the configured CSI reference processes collide, the CSI processes and the CSI reference processes have the same feedback mode and/or feedback type.

Embodiment 8

When an index priority of the CSI reference processes is lower than that of the CSI processes corresponding to the CSI reference processes, and both feed back that collision of the sub-frames of the RI, the RI and PTI or the RI and PMI0 occurs and results in discarding, the terminal preferentially feeds back the RI, or the RI and PTI, or the RI and PMI0 corresponding to the CSI reference processes, or limits that an index priority of the CSI reference processes must be higher than that of the CSI processes configured with the CSI reference processes.

Embodiment 9

When the RI, the RI or PTI, or the RI and PMI0 corresponding to the CSI reference processes is caused to be discarded due to collision with other CSI processes, the terminal calculates CSI reports of the CSI reference processes and the CSI processes corresponding to the CSI reference processes according to the RI, or the RI and PTI, or the RI and PMI0 of the last fed-back CSI reference process.

Embodiment 10

When collision of RI/PTI joint coding sub-frames of the CSI processes of the CSI reference processes occurs and results in discarding, the terminal calculates and feeds back the CSI report of the CSI processes according to the RI and PTI of the last fed-back CSI reference process.

Embodiment 11

When collision of RI sub-frames of the CSI reference processes with RI/PMI0 joint coding sub-frames of the CSI processes configured with the CSI reference processes occurs and results in discarding, the terminal calculates the CSI report of the CSI processes according to the RI of the CSI reference processes and the PMI0 last fed-back by the CSI processes, and feeds back the RI of the CSI reference processes.

Embodiment 12

When collision of RI/PTI joint coding sub-frames of the CSI reference processes with RI/PTI joint coding sub-frames of the CSI processes configured with the CSI reference processes occurs and results in discarding, the terminal calculates the CSI report of the CSI processes according to the RI/PTI of the CSI reference processes, and feeds back the RI/PTI of the CSI reference processes and the calculated CSI report.

Embodiment 13

When collision of RI/PTI joint coding sub-frames of the CSI reference processes with RI/PTI joint coding sub-frames of the CSI processes configured with the CSI reference processes occurs and results in discarding, the terminal calculates the PMI and/or CQI of the CSI processes according to the RI of the CSI reference processes and the last fed-back PTI, and feeds back the RI/PTI of the CSI reference processes and the calculated CSI report.

Embodiment 14

When collision of RI/PMI0 joint coding sub-frames of the CSI reference processes with RI/PMI0 joint coding sub-frames of the CSI processes configured with the CSI reference processes occurs and results in discarding, the terminal calculates the PMI and/or CQI of the CSI processes according to the RI/PMI0 of the CSI reference processes, and feeds back the RI/PMI0 of the CSI reference processes and the calculated CSI report.

Embodiment 15

When collision of RI/PTI joint coding sub-frames of the CSI reference processes with RI/PMI0 joint coding sub-frames of the CSI processes configured with the CSI reference processes occurs and results in discarding, the terminal calculates the PMI and/or CQI of the CSI processes according to the RI of the CSI reference processes and the last fed-back PMI0, and feeds back the RI/PTI of the CSI reference processes and the calculated CSI report.

Embodiment 16

When collision of RI/PMI0 joint coding sub-frames of the CSI reference processes with RI/PMI0 joint coding sub-frames of the CSI processes configured with the CSI reference processes occurs and results in discarding, the terminal calculates the CSI report of the CSI processes according to the RI of the CSI reference processes and the last fed-back PTI or PTI=0 or PTI=1, and feeds back the RI/PTI of the CSI reference processes and the calculated CSI report.

Embodiment 17

When the RI corresponding to the CSI reference processes is caused to be discarded due to collision with other CSI processes, the terminal calculates and feeds back CSI of the CSI reference processes according to the RI of the last fed-back CSI reference process, and calculates and feeds back the CSI of the CSI processes configured with the CSI reference processes according to an RI calculated by a current sub-frame.

Embodiment 18 when the RI corresponding to the CSI reference processes is caused to be discarded due to collision with other CSI processes, the terminal calculates and feeds back CSI of the CSI reference processes according to the RI of the last fed-back CSI reference processes or the RI fed back by the CSI processes which configures the CSI reference process as a reference process.

Embodiment 19

When the base station configures a CSI process to have a CSI reference process, the CSI process shall be configured with the same feedback mode and/or feedback type as the CSI reference process.

When the terminal supposes that a CSI process has a CSI reference process, the CSI process shall have the same feedback mode and feedback type as the configured CSI reference process.

Embodiment 20

The base station only configures CSI reference processes for CSI processes configured as aperiodic feedback.

Only when the terminal is configured as aperiodic feedback are the configured CSI reference processes considered to be effective to the corresponding CSI processes.

Embodiment 21

The base station only configures CSI reference processes for CSI processes configured as aperiodic feedback, and the CSI reference processes are also CSI processes of aperiodic feedback.

Only when the terminal is configured as aperiodic feedback and the CSI reference processes are also CSI processes of aperiodic feedback do the configured CSI reference processes need to be considered to be effective to the corresponding CSI processes.

Embodiment 22

When the base station configures a CSI process to have a CSI reference process and the CSI process is in a feedback mode 2-1, at this moment, the CSI reference process shall be configured with the same feedback mode and feedback type as the CSI process.

When the terminal determines that a CSI process has a CSI reference process and the CSI process is in a feedback mode 2-1, at this moment, the terminal determines that the CSI reference process and the CSI processes have the same feedback mode and feedback type.

Embodiment 23

When the base station configures a CSI process to have a CSI reference process and the CSI process is in a sub-mode 1 of a feedback mode 1, at this moment, the CSI reference process shall be configured with the same feedback mode and feedback type as the CSI process.

When the terminal determines that a CSI process has a CSI reference process and the CSI process is in a sub-mode 1 of a feedback mode 1, at this moment, the terminal determines that the CSI reference process and the CSI processes have the same feedback mode and feedback type.

Embodiment 24

After a CSI process of the terminal is configured with a CSI reference process, the terminal updates the PMI and the CQI according to the RI of the CSI reference process, and calculates and updates the PMI and the CQI according to the RI fed-back by the last CSI reference process only on the PMI or PMI0 feedback sub-frames of the CSI process.

Embodiment 25

After a CSI process of the terminal is configured with a CSI reference process, the terminal updates the PMI and the CQI according to the RI of the CSI reference process, and calculates and updates the PMI and the CQI according to the RI fed-back by the last CSI reference process only on the RI feedback sub-frames of the CSI process.

It needs to be stated that "the last CSI reference process" or "the last fed-back CSI reference process" refers to the CSI reference process that is before the current feedback and has the shortest time interval from the current feedback.

According to the embodiments of the present document, by configuring feedback rules, flexible channel state information feedback can be realized, so as to effectively reducing the uplink feedback overhead and the possible collision probability of information feedback.

Figure 3:
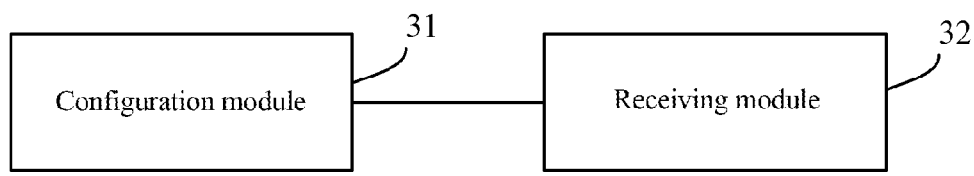
FIG. 3 is a schematic diagram of structure of a base station of the present document.

As shown in FIG. 3, it is a schematic diagram of structure of a base station according to one embodiment of the present document, the base station includes a configuration module 31 and a receiving module 32, wherein:

the configuration module is used to configure a plurality of CSI processes for a terminal, each CSI process at least including information of a channel measurement part and information of an interference measurement part;

the receiving module is used to, when the base station configures corresponding CSI reference processes for partial or all the CSI processes, at least limit a rank indicator (RI) of the CSI processes for calculating a CSI report to be consistent with an RI of the CSI reference processes by configuring the CSI reference processes; and for the CSI processes configured with the CSI reference processes, according to the RI, or the RI and a precoding type indicator (PTI), or the RI and a precoding matrix indicator (PMI0) corresponding to the CSI reference processes, receive a CSI report of the CSI processes.

In addition, the receiving module is further used such that, when collision of the RI, or the RI and PTI, or the RI and PMI0 corresponding to the plurality of CSI processes configured by the base station occurs on partial or all sub-frames and results in discarding, the base station receives the CSI report of the CSI processes according to the RI, or the RI and the PTI, or the RI and the PMI0 of the CSI reference processes corresponding to the CSI processes.

Wherein, the RI and PTI refers to a configuration situation that the RI and the PTI are transmitted on the same sub-frame; and the RI and PMI0 refers to a configuration situation that the RI and the PMI0 are jointly coded on a same sub-frame for transmission.

Preferably, the receiving module is specifically used such that, when the base station configures a corresponding CSI reference process for a current CSI process, the CSI process is configured with a same feedback mode and/or feedback type as the corresponding CSI reference process; when the base station configures a corresponding CSI reference process and periodic feedback for a current CSI process, the current CSI process is configured with the same feedback mode and/or feedback type as the corresponding CSI reference process; when the base station configures a corresponding CSI reference process for a current CSI process, a number of ports for non-zero power (NZP) channel state information reference signals (CSI-RS) of the CSI process and the corresponding CSI reference process is eight, and both are configured with RI feedback, the current CSI process is configured with the same feedback mode and/or feedback type as the corresponding CSI reference process; when the base station configures a corresponding CSI reference process for a current CSI process, the number of ports for NZP CSI-RS of the CSI process and the CSI reference process is eight, and both are configured with RI feedback and periodic feedback, the current CSI process is configured with the same feedback mode and/or feedback type as the corresponding CSI reference process; when the base station configures a corresponding CSI reference process for a current CSI process, the number of ports for the NZP CSI-RS of the CSI process and the CSI reference process is eight, and both are configured with RI feedback and a sub-mode 1 of a physical uplink control channel (PUCCH) mode 1-1 or a PUCCH mode 2-1 of periodic feedback, the current CSI process is configured with the same feedback mode and/or feedback type as the corresponding CSI reference process; when the base station configures CSI reference processes only for CSI processes configured as aperiodic feedback, the CSI processes configured as aperiodic feedback are configured with the same feedback mode and/or feedback type as the corresponding CSI reference processes; when the base station configures CSI reference processes only for CSI processes configured as aperiodic feedback and the CSI reference processes are also CSI processes of aperiodic feedback, the CSI processes configured as aperiodic feedback are configured with the same feedback mode and/or feedback type as the corresponding CSI reference processes; when the base station configures a corresponding CSI reference process for a current CSI process and the current CSI process is in a feedback mode 2-1, the corresponding CSI reference process is configured with the same feedback mode and feedback type as the current CSI process; or when the base station configures a corresponding CSI reference process for a current CSI process and the current CSI process is in a sub-mode 1 of a feedback mode 1, the corresponding CSI reference process is configured with the same feedback mode and feedback type as the current CSI process.

In addition, the receiving module is further used such that: when the base station configures the number of ports for the NZP CSI-RS of the CSI processes respectively as eight, all are configured with RI feedback and CSI reference processes, and a PUCCH feedback mode is a sub-mode 1 of 1-1 or a PUCCH feedback mode 2-1; or when the base station configures the number of ports for the NZP CSI-RS of the CSI processes respectively as eight, all are configured with RI feedback and CSI reference processes, a PUCCH feedback mode is a sub-mode 1 of 1-1 or a PUCCH feedback mode 2-1, and collision of RI or PTI sub-frames of the CSI processes and the configured CSI reference processes or collision of RI or PMI0 sub-frames of the CSI processes and the configured CSI reference processes occurs and results in discarding, the base station configures the CSI processes and the corresponding CSI reference processes to have the same feedback mode and/or feedback type; or when the base station configures the number of ports for the NZP CSI-RS of the CSI processes respectively as eight and all are configured with RI feedback, CSI reference processes and periodic feedback; or when the base station configures the number of ports for the NZP CSI-RS of the CSI processes respectively as eight, all are configured with RI feedback, CSI reference processes and periodic feedback, and collision of RI or PTI sub-frames of the CSI processes and of the configured CSI reference processes or collision of RI or PMI0 sub-frames of the CSI process and of the configured CSI reference processes occurs and results in discarding, the base station configures the CSI processes and the corresponding CSI reference processes to have the same feedback mode and/or feedback type.

Wherein, the receiving module is specifically used to: when the CSI reference processes and non-CSI reference processes feed back that collision of sub-frames of the RI, or the RI and PTI, or the RI and PMI0 of CSI occurs and results in discarding, receive the CSI report of the CSI processes corresponding to the CSI reference processes preferentially according to the RI, or the RI and PTI, or the RI and PMI0 corresponding to the CSI reference processes; when the CSI reference processes and the CSI processes corresponding to the CSI reference processes feed back that collision of sub-frames of the RI, the RI or PTI or the RI and PMI0 occurs and results in discarding, receive the CSI report of the CSI processes corresponding to the CSI reference processes according to the RI, or the RI and PTI, or the RI and PMI0 corresponding to the CSI reference processes; when an index priority of the CSI reference processes is lower than that of the CSI processes corresponding to the CSI reference processes and both feed back that collision of sub-frames of the RI, or RI and PTI, or the RI and PMI0 occurs and results in discarding, receive the CSI report of the CSI processes corresponding to the CSI reference processes according to the RI, or the RI and PTI, or the RI and PMI0 corresponding to the CSI reference processes, or limit that the index priority of the CSI reference processes must be higher than that of the CSI processes corresponding to the CSI reference processes; when collision of the RI, or the PTI and RI, or the RI and PMI0 corresponding to the CSI reference processes with other CSI processes occurs and results in discarding, receive the CSI report of the CSI processes corresponding to the CSI reference processes according to the RI, or the RI and PTI, or the RI and PMI0 corresponding to the last fed-back CSI reference processes; when collision of RI sub-frames of the CSI reference processes with RI or PTI joint coding sub-frames of the CSI processes corresponding to the CSI reference processes occurs and results in discarding, receive the CSI report of the CSI processes corresponding to the CSI reference processes according to the RI of the CSI reference processes and the last fed-back PTI or PTI=0 or PTI=1; when collision of RI sub-frames of the CSI reference processes with RI or PMI0 joint coding sub-frames of the CSI processes corresponding to the CSI reference processes occurs and results in discarding, receive the CSI report of the CSI processes corresponding to the CSI reference processes according to the RI corresponding to the CSI reference processes and the PMI0 last fed-back by the CSI processes; when collision of RI or PTI joint coding sub-frames of the CSI reference processes with RI or PTI joint coding sub-frames of the CSI processes corresponding to the CSI reference processes occurs and results in discarding, receive the CSI report of the CSI processes according to the RI or PTI corresponding to the CSI reference processes; when collision of RI or PTI joint coding sub-frames of the CSI reference processes with RI or PTI joint coding sub-frames of the CSI processes corresponding to the CSI reference processes occurs and results in discarding, receive the CSI report of the CSI processes according to the RI corresponding to the CSI reference processes and the last fed-back PTI, the CSI report including a PMI and/or a channel quality indicator (CQI); when collision of RI or PMI0 joint coding sub-frames of the CSI reference processes with RI or PMI0 joint coding sub-frames of the CSI processes corresponding to the CSI reference processes occurs and results in discarding, receive the CSI report of the CSI processes according to the RI or the CQI corresponding to the CSI reference processes, the CSI report including a PMI and/or CQI; when collision of RI or PTI joint coding sub-frames of the CSI reference processes with RI or PMI0 joint coding sub-frames of the CSI processes corresponding to the CSI reference processes occurs and results in discarding, receive the CSI report of the CSI processes according to the RI corresponding to the CSI reference processes and the last fed-back PMI0, the CSI report including a PMI and/or a CQI; when collision of RI or PMI0 joint coding sub-frames of the CSI reference processes with RI or PMI0 joint coding sub-frames of the CSI processes corresponding to the CSI reference processes occurs and results in discarding, receive the CSI report of the CSI processes according to the RI corresponding to the CSI reference processes and the last fed-back PTI or PTI=0 or PTI=1; when collision of the RI corresponding to the CSI reference processes with other CSI processes occurs and results in discarding, receive the CSI report of the CSI reference processes according to the RI corresponding to the last fed-back CSI reference process, and receive the CSI report of the CSI processes according to an RI calculated by a current sub-frame; or when collision of the RI corresponding to the CSI reference processes with other CSI processes occurs and results in discarding, receive the CSI report of the CSI reference processes according to the RI corresponding to the last fed-back CSI reference process or the RI fed back by the CSI processes corresponding to the CSI reference processes.

The above-mentioned base station can realize flexible channel state information configuration.

Figure 4:
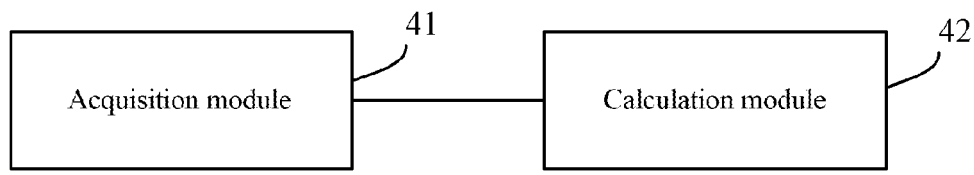
FIG. 4 is a schematic diagram of structure of a terminal of the present document.

As shown in FIG. 4, it is a schematic diagram of structure of a terminal according to one embodiment of the present document, the terminal includes an acquisition module 41 and a calculation module 42, wherein:

the acquisition module is used to acquire CSI processes from a base station; and the calculation module is used such that, when part or all of the CSI processes acquired by the acquisition module are configured with CSI reference processes, the terminal calculates a CSI report of the CSI processes configured with the CSI reference processes according to a rank indicator (RI), or the RI and a precoding type indicator (PTI), or the RI and a precoding matrix indicator (PMI0) corresponding to the CSI reference processes.

In addition, the calculation module is further used to, when collision of the RI, or the RI and PTI, or the RI and PMI0 corresponding to a plurality of CSI processes fed back by the terminal occurs on partial or all sub-frames and results in discarding, calculate the CSI report corresponding to the CSI processes according to the RI, or the RI and PTI, or the RI and PMI0 corresponding to the CSI reference processes.

Wherein, the CSI report includes one or more of the following contents: PMI, CQI, PMI0 and PMI1.

The calculation module is further used such that: when a CSI process of the terminal is configured with a corresponding CSI reference process, the terminal determines that the CSI process and the CSI reference process have a same feedback mode and/or feedback type; when a CSI process of the terminal is configured with a corresponding CSI reference process and periodic feedback, the terminal determines that the CSI process and the CSI reference process have the same feedback mode and/or feedback type; when a number of ports for non-zero power (NZP) channel state information reference signals (CSI-RS) of CSI reference processes and CSI processes configured with the CSI reference processes is respectively configured as eight, and all are configured with RI feedback, the terminal determines that the CSI processes and the CSI reference processes have the same feedback mode and/or feedback type; when the number of ports for NZP CSI-RS of CSI reference processes and CSI processes configured with the CSI reference processes is respectively configured as eight, and all are configured with RI feedback and periodic feedback, the terminal determines that the CSI processes and the CSI reference processes have the same feedback mode and/or feedback type; when the number of ports for NZP CSI-RS of CSI processes is respectively configured as eight, all are configured with RI feedback and CSI reference processes, and a physical uplink control channel (PUCCH) feedback mode is a sub-mode 1 of 1-1 or a PUCCH mode 2-1; or when the number of ports for NZP CSI-RS of CSI processes is respectively as eight, all are configured with RI feedback and CSI reference processes, a PUCCH feedback mode is a sub-mode 1 of 1-1 or a PUCCH feedback mode 2-1, and collision of RI or PTI sub-frames or RI or PMI0 sub-frames of the CSI processes and of the configured CSI reference processes occurs and results in discarding, the terminal determines that the CSI processes and the CSI reference processes have the same feedback mode and/or feedback type; when the terminal is configured as aperiodic feedback, the terminal determines that the configured CSI reference processes are effective to the corresponding CSI processes; when the terminal is configured as aperiodic feedback and the corresponding CSI reference processes are also CSI processes of aperiodic feedback, the terminal determines that the configured CSI reference processes are effective to the corresponding CSI processes; when a CSI process of the terminal is configured with a corresponding CSI reference process and the CSI process is in a feedback mode 2-1, the terminal determines that the CSI reference process and the CSI process have the same feedback mode and/or feedback type; or when a CSI process of the terminal is configured with a corresponding CSI reference process and the CSI process is in a sub-mode 1 of a feedback mode 1, the terminal determines that the CSI reference process and the CSI process have the same feedback mode and/or feedback type.

Preferably, the calculation module is specifically used to: when sub-frames for feeding back the RI, or the RI and PTI, or the RI and PMI0 of CSI of the CSI reference processes and non-CSI reference processes collide and result in discarding, preferentially feed back the RI, or the RI and PTI, or the RI and PMI0 corresponding to the CSI reference processes; when sub-frames for feeding back the RI, or the RI and PTI, or the RI and PMI0 of CSI of the CSI reference processes and the CSI processes corresponding to the CSI reference processes collide and result in discarding, preferentially feed back the RI, or the RI and PTI, or the RI and PMI0 corresponding to the CSI reference processes; when an index priority of the CSI reference processes is lower than that of the CSI processes corresponding to the CSI reference processes, and sub-frames for feeding back the RI, the RI and PTI or the RI and PMI0 of the CSI reference processes and the CSI processes collide and result in discarding, preferentially feed back the RI, or the RI and PTI, or the RI and PMI0 corresponding to the CSI reference processes, or limit that the index priority of the CSI reference processes must be higher than that of the CSI processes; when collision of the RI, the RI or PTI, or the RI or PMI0 corresponding to the CSI reference processes with other CSI processes occurs and results in discarding, calculate CSI reports of the CSI reference processes and the CSI processes corresponding to the CSI reference processes according to the RI, or the RI and PTI, or the RI and PMI0 of the last fed-back CSI reference process; when collision of RI sub-frames of the CSI reference processes with RI or PTI joint coding sub-frames of the CSI processes corresponding to the CSI reference processes occurs and results in discarding, calculate the CSI report of the CSI processes according to the RI of the CSI reference processes and the last fed-back PTI or PTI=0 or PTI=1, and feed back the RI of the CSI reference processes; when collision of RI sub-frames of the CSI reference processes with RI or PMI0 joint coding sub-frames of the CSI processes corresponding to the CSI reference processes occurs and results in discarding, calculate the CSI report of the CSI processes according to the RI of the CSI reference processes and the PMI0 last fed-back by the CSI processes, and feed back the RI of the CSI reference processes; when collision of RI or PTI joint coding sub-frames of the CSI reference processes and of the CSI processes corresponding to the CSI reference processes occurs and results in discarding, calculate the CSI report of the CSI processes according to the RI or PTI of the CSI reference processes, and feed back the RI or PTI of the CSI reference processes and the calculated CSI report; when collision of RI or PTI joint coding sub-frames of the CSI reference processes and of the CSI processes corresponding to the CSI reference processes occurs and results in discarding, calculate the CSI report according to the RI of the CSI reference processes and the last fed-back PTI, and feed back the RI or PTI of the CSI reference processes and the calculated CSI report, the CSI report including a PMI and/or a channel quality indicator (CQI); when collision of RI or PMI0 joint coding sub-frames of the CSI reference processes and the CSI processes corresponding to the CSI reference processes occurs and results in discarding, calculate the CSI report according to the RI or PMI0 of the CSI reference processes, and feed back the RI or the PMI0 of the CSI reference processes and the calculated CSI report, the CSI report including a PMI and/or a CQI; when collision of RI or PTI joint coding sub-frames of the CSI reference processes with RI or PMI0 joint coding sub-frames of the CSI processes corresponding to the CSI reference processes occurs and results in discarding, calculate the CSI report of the CSI processes according to the RI of the CSI reference processes and the last fed-back PMI0, and feed back the RI or PTI of the CSI reference processes and the calculated CSI report, the CSI report including a PMI and/or a CQI; when collision of RI or PMI0 joint coding sub-frames of the CSI reference processes and the CSI processes corresponding to the CSI reference processes occurs and results in discarding, calculate the CSI report of the CSI processes according to the RI of the CSI reference processes and the last fed-back PTI or PTI=0 or PTI=1, and feed back the RI or PTI of the CSI reference processes and the calculated CSI report; when collision of the RI corresponding to the CSI reference processes with other CSI processes occurs and results in discarding, calculate and feed back the CSI report of the CSI reference processes according to the last fed-back RI of the CSI reference processes, and calculate and feed back the CSI report of the CSI processes corresponding to the CSI reference processes according to an RI calculated by a current sub-frame; or when collision of the RI corresponding to the CSI reference processes with other CSI processes occurs and results in discarding, calculate and feed back the CSI of the CSI reference processes according to the last fed-back RI of the CSI reference processes or the RI fed back by the CSI processes corresponding to the CSI reference processes.

Preferably, the calculation module is specifically used to, when a CSI process of the terminal is configured with a corresponding CSI reference process, update the PMI and the CQI according to the RI of the corresponding CSI reference process. Specifically, the calculation calculates and updates the PMI and the CQI according to the RI fed back by the last CSI reference processes on PMI or PMI0 feedback sub-frames of the CSI processes; or calculates and updates the PMI and the CQI according to the R1 feed back by the last CSI reference processes on RI feedback sub-frames of the CSI processes.

The above-mentioned terminal can realize flexible channel state information feedback, so as to effectively reducing the uplink feedback overhead and the possible collision probability of information feedback.

Those skilled in the art can understand that all or part of steps in the above-mentioned methods can be completed by a program instructing relevant hardware, and the program can be stored in computer readable storage media such as read only memories, disks or compact disks. Optionally, all or part of the steps of the above-mentioned embodiments can also be realized by using one or a plurality of integrated circuits. Correspondingly, the modules/units in the above-mentioned embodiments can be realized by means of hardware, and can also be realized by means of software functional modules. The present document is not limited to any specific type of combination of hardware and software.

The above-mentioned embodiments are just used for describing the technical solutions of the present document, instead of limiting. The present document is expounded just by referring to the preferred embodiments. Those skilled in the art shall understand that modifications or equivalents can be made to the technical solutions of the present document. However, all such modifications or equivalents, without departing from the spirit and the range of the technical solutions of the present document, shall also be included in the range of the claims of the present document.

INDUSTRIAL APPLICABILITY

The embodiments of the present document can realize flexible channel station information configuration and feedback.

What is claimed is:

1. A method for processing channel state information (CSI), comprising:

a base station configuring a plurality of CSI processes for a terminal, each CSI process at least including information of a channel measurement part and information of an interference measurement part;

when the base station configures corresponding CSI reference processes for partial or all the CSI processes, at least limiting a rank indicator (RI) of the CSI processes for calculating a CSI report to be consistent with an RI of the CSI reference processes by configuring the CSI reference processes; and for the CSI processes configured with the CSI reference processes, the base station receiving a CSI report of the CSI processes according to the RI, or the RI and a precoding type indicator (PTI), or the RI and a precoding matrix indicator (PMI0) corresponding to the CSI reference processes wherein, the RI and PTI refers to a configuration situation that the RI and the PTI are transmitted on a same sub-frame; and the RI and PMI0 refers to a configuration situation that the RI and the PMI0 are jointly encoded on a same sub-frame for transmission;

or, when the base station configures corresponding CSI reference processes for partial or all the CSI processes, at least limiting the RI of the CSI processes for calculating a CSI report to be consistent with a fed-back RI of the CSI reference processes by configuring the CSI reference processes comprises:

when the base station configures a corresponding CSI reference process for a current CSI process, the CSI process being configured with a same feedback mode and feedback type as the corresponding CSI reference process; or when the base station configures a corresponding CSI reference process and periodic feedback for a current CSI process, the current CSI process being configured with the same feedback mode and feedback type as the corresponding CSI reference process; or when the base station configures a corresponding CSI reference process for a current CSI process, a number of ports for non-zero power (NZP) channel state information reference signals (CSI-RS) of the CSI process and the corresponding CSI reference process is eight, and both are configured with RI feedback, the current CSI process being configured with the same feedback mode and feedback type as the corresponding CSI reference process; or when the base station configures a corresponding CSI reference process for a current CSI process, the number of ports for NZP CSI-RS of the CSI process and the CSI reference process is eight, and both are configured with RI feedback and periodic feedback, the current CSI process being configured with the same feedback mode and feedback type as the corresponding CSI reference process; or when the base station configures a corresponding CSI reference process for a current CSI process, the number of ports for the NZP CSI-RS of the CSI process and the CSI reference process is eight, and both are configured with RI feedback and a sub-mode 1 of a physical uplink control channel (PUCCH) mode 1-1 or a PUCCH mode 2-1 of periodic feedback, the current CSI process being configured with the same feedback mode and feedback type as the corresponding CSI reference process; or when the base station configures CSI reference processes only for CSI processes configured as aperiodic feedback, the CSI processes configured as aperiodic feedback being configured with the same feedback mode and feedback type as the corresponding CSI reference processes; or when the base station configures CSI reference processes only for CSI processes configured as aperiodic feedback and the CSI reference processes are also CSI processes of aperiodic feedback, the CSI processes configured as aperiodic feedback being configured with the same feedback mode and feedback type as the corresponding CSI reference processes; or when the base station configures a corresponding CSI reference process for a current CSI process and the current CSI process is in a feedback mode 2-1, the corresponding CSI reference process being configured with the same feedback mode and feedback type as the current CSI process; or when the base station configures a corresponding CSI reference process for a current CSI process and the current CSI process is in a sub-mode 1 of a feedback mode 1, the corresponding CSI reference process being configured with the same feedback mode and feedback type as the current CSI process.

2. The method according to claim 1, wherein the method further comprises:

when collision of the RI, or the RI and PTI, or the RI and PMI0 corresponding to the plurality of CSI processes configured by the base station occurs on partial or all sub-frames and results in discarding, the base station receiving the CSI report of the CSI processes according to the RI, or the RI and PTI, or the RI and PMI0 of the CSI reference processes corresponding to the CSI processes.

3. The method according to claim 2, wherein the method further comprises:

when the base station configures the number of ports for the non-zero power (NZP) CSI-RS of the CSI processes respectively as eight, and all are configured with RI feedback and CSI reference processes, and a Physical Uplink Control Channel (PUCCH) feedback mode is a sub-mode 1 of 1-1 or a PUCCH feedback mode 2-1; or when the base station configures the number of ports for the NZP CSI-RS of the CSI processes respectively as eight, all are configured with RI feedback and CSI reference processes, a PUCCH feedback mode is a sub-mode 1 of 1-1 or a PUCCH feedback mode 2-1, and collision of RI or PTI sub-frames of the CSI processes and of the configured CSI reference processes or collision of RI or PMI0 sub-frames of the CSI processes and of the configured CSI reference processes occurs and results in discarding, the base station configuring the CSI processes and the corresponding CSI reference processes to have the same feedback mode and/or feedback type; or when the base station configures the number of ports for the NZP CSI-RS of the CSI processes respectively as eight, and all are configured with RI feedback, CSI reference processes and periodic feedback; or when the base station configures the number of ports for the NZP CSI-RS of the CSI processes respectively as eight, all are configured with RI feedback, CSI reference processes and periodic feedback, and collision of RI or PTI sub-frames of the CSI processes and of the configured CSI reference processes or collision of RI or PMI0 sub-frames of the CSI processes and of the configured CSI reference processes occurs and results in discarding, the base station configuring the CSI processes and the corresponding CSI reference processes to have the same feedback mode and/or feedback type.

4. The method according to claim 2, wherein,
when collision of the RI, or the RI and PTI, or the RI and PMI0 corresponding to the CSI processes configured by the base station with sub-frames of other CSI processes and discarding occur on partial or all sub-frames, the base station receiving the CSI report of the CSI processes according to the RI, or the RI and PTI, or the RI and PMI0 of the CSI reference processes corresponding to the CSI processes comprises:
when the CSI reference processes and non-CSI reference processes feed back that collision of sub-frames of the RI, or the RI and PTI, or the RI and PMI0 of CSI occurs and results in discarding, the base station receiving the CSI report of the CSI processes corresponding to the CSI reference processes preferentially according to the RI, or the RI and PTI, or the RI and PMI0 corresponding to the CSI reference processes; or
when a collision occurs and results in discarding,
when collision of the RI, or the PTI and RI, or the RI and PMI0 corresponding to the CSI reference processes with other CSI processes occurs and results in discarding, the base station receiving the CSI report of the CSI processes corresponding to the CSI reference processes according to the RI, or the RI and PTI, or the RI and PMI0 corresponding to a last fed-back CSI reference process; or
when collision of RI sub-frames of the CSI reference processes with RI or PTI joint coding sub-frames of the CSI processes corresponding to the CSI reference processes occurs and results in discarding, the base station receiving the CSI report of the CSI processes corresponding to the CSI reference processes according to the RI of the CSI reference processes and the last fed-back PTI or PTI=0 or PTI=1; or
when collision of RI sub-frames of the CSI reference processes with RI or PMI0 joint coding sub-frames of the CSI processes corresponding to the CSI reference processes occurs and results in discarding, the base station receiving the CSI report of the CSI processes corresponding to the CSI reference processes according to the RI corresponding to the CSI reference processes and the last fed-back PMI0 of the CSI processes; or
when collision of RI or PTI joint coding sub-frames of the CSI reference processes with RI or PTI joint coding sub-frames of the CSI processes corresponding to the CSI reference processes occurs and results in discarding, the base station receiving the CSI report of the CSI processes according to the RI or PTI corresponding to the CSI reference processes; or
when collision of RI or PTI joint coding sub-frames of the CSI reference processes with RI or PTI joint coding sub-frames of the CSI processes corresponding to the CSI reference processes occurs and results in discarding, the base station receiving the CSI report of the CSI processes according to the RI corresponding to the CSI reference processes and the last fed-back PTI, the CSI report comprising a PMI and/or a channel quality indicator (CQI); or
when collision of RI or PMI0 joint coding sub-frames of the CSI reference processes with RI or PMI0 joint coding sub-frames of the CSI processes corresponding to the CSI reference processes occurs and results in discarding, the base station receiving the CSI report of the CSI processes according to the RI or CQI corresponding to the CSI reference processes, the CSI report comprising a PMI and/or a CQI; or
when collision of RI or PTI joint coding sub-frames of the CSI reference processes with RI or PMI0 joint coding sub-frames of the CSI processes corresponding to the CSI reference processes occurs and results in discarding, the base station receiving the CSI report of the CSI processes according to the RI corresponding to the CSI reference processes and the last fed-back PMI0, the CSI report comprising a PMI and/or a CQI; or
when collision of RI or PMI0 joint coding sub-frames of the CSI reference processes with RI or PMI0 joint coding sub-frames of the CSI processes corresponding to the CSI reference processes occurs and results in discarding, the base station receiving the CSI report of the CSI processes according to the RI corresponding to the CSI reference processes and the last fed-back PTI or PTI=0 or PTI=1; or
when collision of the RI corresponding to the CSI reference processes with other CSI processes occurs and results in discarding, the base station receiving the CSI report of the CSI reference processes according to the RI corresponding to the last fed-back CSI reference process, and receiving the CSI report of the CSI processes according to an RI calculated by a current sub-frame; or
when collision of the RI corresponding to the CSI reference processes with other CSI processes occurs and results in discarding, the base station receiving the CSI report of the CSI reference processes according to the RI corresponding to the last fed-back CSI reference process or the RI fed back by the CSI processes corresponding to the CSI reference processes.

5. A method for processing channel state information (CSI), comprising:
a terminal acquiring CSI processes from a base station, and when part or all of the CSI processes are configured with CSI reference processes, the terminal calculating a CSI report of the CSI processes configured with the CSI reference processes according to a rank indicator (RI), or the RI and a precoding type indicator (PTI), or the RI and a precoding matrix indicator (PMI0) corresponding to the CSI reference processes
when part or all of the CSI processes are configured with the CSI reference processes, the terminal calculating the CSI report of the CSI processes configured with the CSI reference processes according to the RI, or the RI and PTI, or the RI and PMI0 corresponding to the CSI reference processes comprises:
when a CSI process of the terminal is configured with a corresponding CSI reference process, the terminal updating the PMI and the CQI according to the RI of the corresponding CSI reference process;
preferably, wherein,
the terminal updating the PMI and the CQI according to the RI of the corresponding CSI reference process comprises:
the terminal calculating and updating the PMI and the CQI according to the RI fed back by the last CSI reference process on PMI or PMI0 feedback sub-frames of the CSI process; or the terminal calculating and updating the PMI and the CQI according to the RI fed back by the last CSI reference process on RI feedback sub-frames of the CSI process.

6. The method according to claim 5, wherein the method further comprises:
when collision of the RI, or the RI and PTI, or the RI and PMI0 corresponding to a plurality of CSI processes fed back by the terminal occurs on partial or all sub-frames and results in discarding, calculating the CSI report corresponding to the CSI processes according to the RI, or the RI and PTI, or the RI and PMI0 of the corresponding CSI reference processes.

7. The method according to claim 6, wherein,
when collision of the RI, or the RI and PTI, or the RI and PMI0 corresponding to a plurality of CSI processes fed back by the terminal occurs on partial or all sub-frames and results in discarding, calculating the CSI report corresponding to the CSI processes according to the RI, or the RI and PTI, or the RI and PMI0 of the corresponding CSI reference processes comprises:
when the CSI reference processes and non-CSI reference processes feed back that collision of sub-frames of the RI, or the RI and PTI, or the RI and PMI0 of CSI occurs and results in discarding, the terminal preferentially feeding back the RI, or the RI and PTI, or the RI and PMI0 corresponding to the CSI reference processes; or
when the CSI reference processes and the CSI processes corresponding to the CSI reference processes feed back that collision of sub-frames of the RI, or the RI and PTI, or the RI and PMI0 occurs and results in discarding, the terminal preferentially feeding back the RI, or the RI and PTI, or the RI and PMI0 corresponding to the CSI reference processes; or
when an index priority of CSI reference processes is lower than that of the CSI processes corresponding to the CSI reference processes, and both feed back that collision of the sub-frames of the RI, the RI and PTI or the RI and PMI0 occurs and results in discarding, the terminal preferentially feeding back the RI, or the RI and PTI, or the RI and PMI0 corresponding to the CSI reference processes, or limiting that an index priority of the CSI reference processes must be higher than that of the CSI processes; or
when collision of the RI, the RI or PTI, or the RI or PMI0 corresponding to the CSI reference processes with other CSI processes occurs and results in discarding, calculating CSI reports of the CSI reference processes and the CSI processes corresponding to the CSI reference processes according to the RI, or the RI and PTI, or the RI and PMI0 of the last fed-back CSI reference process; or
when collision of RI sub-frames of the CSI reference processes with RI or PTI joint coding sub-frames of the CSI processes corresponding to the CSI reference processes occurs and results in discarding, the terminal calculating the CSI report of the CSI processes according to the RI of the CSI reference processes and the last fed-back PTI or PTI=0 or PTI=1, and feeding back the RI of the CSI reference processes; or
when collision of RI sub-frames of the CSI reference processes with RI or PMI0 joint coding sub-frames of the CSI processes corresponding to the CSI reference processes occurs and results in discarding, the terminal calculating the CSI report of the CSI processes according to the RI of the CSI reference processes and the PMI0 last fed back by the CSI processes, and feeding back the RI of the CSI reference processes; or
when collision of RI or PTI joint coding sub-frames of the CSI reference processes and of the CSI processes corresponding to the CSI reference processes occurs and results in discarding, the terminal calculating the CSI report of the CSI processes according to the RI or PTI of the CSI reference processes, and feeding back the RI or PTI of the CSI reference processes and the calculated CSI report; or
when collision of RI or PTI joint coding sub-frames of the CSI reference processes and of the CSI processes corresponding to the CSI reference processes occurs and results in discarding, the terminal calculating the CSI report according to the RI of the CSI reference processes and the last fed-back PTI, and feeding back the RI or PTI of the CSI reference processes and the calculated CSI report, the CSI report comprising a PMI and/or a channel quality indicator (CQI); or
when collision of RI or PMI0 joint coding sub-frames of the CSI reference processes and of the CSI processes corresponding to the CSI reference processes occurs and results in discarding, the terminal calculating the CSI report according to the RI or PMI0 of the CSI reference processes, and feeding back the RI or PMI0 of the CSI reference processes and the calculated CSI report, the CSI report comprising a PMI and/or a CQI; or
when collision of RI or PTI joint coding sub-frames of the CSI reference processes with RI or PMI0 joint coding sub-frames of the CSI processes corresponding to the CSI reference processes occurs and results in discarding, the terminal calculating the CSI report of the CSI processes according to the RI of the CSI reference processes and the last fed-back PMI0, and feeding back the RI or PTI of the CSI reference processes and the calculated CSI report, the CSI report comprising a PMI and/or a CQI; or
when collision of RI or PMI0 joint coding sub-frames of the CSI reference processes and of the CSI processes corresponding to the CSI reference processes occurs and results in discarding, the terminal calculating the CSI report of the CSI processes according to the RI of the CSI reference processes and the last fed-back PTI or PTI=0 or PTI=1, and feeding back the RI or PTI of the CSI reference processes and the calculated CSI report; or
when collision of the RI corresponding to the CSI reference processes with other CSI processes occurs and results in discarding, the terminal calculating and feeding back the CSI report of the CSI reference processes according to the RI of the last fed-back CSI reference process, and calculating and feeding back the CSI report of the CSI processes corresponding to the CSI reference processes according to an RI calculated by a current sub-frame; or
when collision of the RI corresponding to the CSI reference processes with other CSI processes occurs and results in discarding, the terminal calculating and feeding back CSI of the CSI reference processes according to the RI of the last fed-back CSI reference process or the RI fed back by the CSI processes corresponding to the CSI reference processes.

8. The method according to claim 5, wherein,
the CSI report comprises one or more of the following contents: PMI, CQI, PMI0 and PMI1, or, the method further comprises:

when a CSI process of the terminal is configured with a corresponding CSI reference process, the terminal determining that the CSI process and the CSI reference process have a same feedback mode and feedback type; or when a CSI process of the terminal is configured with a corresponding CSI reference process and periodic feedback, the terminal determining that the CSI process and the CSI reference process have the same feedback mode and feedback type; or when a number of ports for non-zero power (NZP) channel state information reference signals (CSI-RS) of CSI reference processes and CSI processes configured with the CSI reference processes is respectively configured as eight, and all are configured with RI feedback, the terminal determining that the CSI processes and the CSI reference processes have the same feedback mode and feedback type; or when the number of ports for NZP CSI-RS of CSI reference processes and CSI processes configured with the CSI reference processes is respectively configured as eight, and all are configured with RI feedback and periodic feedback, the terminal determining that the CSI processes and the CSI reference processes have the same feedback mode and feedback type; or when the number of ports for NZP CSI-RS of CSI processes is respectively configured as eight, and all are configured with RI feedback and CSI reference processes, and a physical uplink control channel (PUCCH) feedback mode is a sub-mode 1 of 1-1 or a PUCCH feedback mode 2-1; or when the number of ports for NZP CSI-RS of CSI processes is respectively as eight, all are configured with RI feedback and CSI reference processes, a PUCCH feedback mode is a sub-mode 1 of 1-1 or a PUCCH feedback mode 2-1, and when collision of RI or PTI sub-frames or RI or PMI0 sub-frames of the CSI processes and the configured CSI reference processes occurs and results in discarding, the terminal determining that the CSI processes and the CSI reference processes have the same feedback mode and feedback type; or when the terminal is configured as aperiodic feedback, the terminal determining that the configured CSI reference processes are effective to the corresponding CSI processes; or when the terminal is configured as aperiodic feedback and the corresponding CSI reference processes are also CSI processes of aperiodic feedback, the terminal determining that the configured CSI reference processes are effective to the corresponding CSI processes; or when a CSI process of the terminal is configured with a corresponding CSI reference process and the CSI process is in a feedback mode 2-1, the terminal determining that the CSI reference process and the CSI process have the same feedback mode and feedback type; or when a CSI process of the terminal is configured with a corresponding CSI reference process and the CSI process is in a sub-mode 1 of a feedback mode 1, the terminal determining that the CSI reference process and the CSI process have the same feedback mode and feedback type.

9. A base station, comprising a processor configured to:
configure a plurality of CSI processes for a terminal, each CSI process at least comprising information of a channel measurement part and information of an interference measurement part; and when the base station configures corresponding CSI reference processes for partial or all the CSI processes, at least limit a rank indicator (RI) of the CSI processes for calculating a CSI report to be consistent with an RI of the CSI reference processes by configuring the CSI reference processes; and for the CSI processes configured with CSI reference processes, according to the RI, or the RI and a precoding type indicator (PTI), or the RI and a precoding matrix indicator (PMI0) corresponding to the CSI reference processes, receive a CSI report of the CSI processes wherein, the RI and PTI refers to a configuration situation that the RI and the PTI are transmitted on the same sub-frame; and the RI and PMI0 refers to a configuration situation that the RI and the PMI0 are jointly encoded on a same sub-frame for transmission;

or, the processor is set such that:

when the base station configures a corresponding CSI reference process for a current CSI process, the CSI process is configured with a same feedback mode and feedback type as the corresponding CSI reference process; or when the base station configures a corresponding CSI reference process and periodic feedback for a current CSI process, the current CSI process is configured with the same feedback mode and feedback type as the corresponding CSI reference process; or when the base station configures a corresponding CSI reference process for a current CSI process, a number of ports for non-zero power (NZP) channel state information reference signals (CSI-RS) of the CSI process and the corresponding CSI reference process is eight, and both are configured with RI feedback, the current CSI process is configured with the same feedback mode and feedback type as the corresponding CSI reference process; or when the base station configures a corresponding CSI reference process for a current CSI process, the number of ports for NZP CSI-RS of the CSI process and the CSI reference process is eight, and both are configured with RI feedback and periodic feedback, the current CSI process is configured with the same feedback mode and feedback type as the corresponding CSI reference process; or when the base station configures a corresponding CSI reference process for a current CSI process, the number of ports for the NZP CSI-RS of the CSI process and the CSI reference process is eight, and both are configured with RI feedback and a sub-mode 1 of a physical uplink control channel (PUCCH) mode 1-1 or a PUCCH mode 2-1 of periodic feedback, the current CSI process is configured with the same feedback mode and feedback type as the corresponding CSI reference process; or when the base station configures CSI reference processes only for CSI processes configured as aperiodic feedback, the CSI processes configured as aperiodic feedback are configured with the same feedback mode and feedback type as the corresponding CSI reference processes; or when the base station configures CSI reference processes only for CSI processes configured as aperiodic feedback and the CSI reference processes are also CSI processes of aperiodic feedback, the CSI processes configured as aperiodic feedback are configured with the same feedback mode and feedback type as the corresponding CSI reference processes; or when the base station configures a corresponding CSI reference process for a current CSI process and the current CSI process is in a feedback mode 2-1, the corresponding CSI reference process is configured with the same feedback mode and feedback type as the current CSI process; or when the base station configures a corresponding CSI reference process for a current CSI process and the current CSI process is in a sub-mode 1 of a feedback mode 1, the corresponding CSI reference process is configured with the same feedback mode and feedback type as the current CSI process.

10. The base station according to claim 9, wherein, the processor is further set such that: when collision of the RI, or the RI and PTI, or the RI and PMI0 corresponding to the plurality of CSI processes configured by the base station occurs on partial or all sub-frames and results in discarding, the base station receives the CSI report of the CSI processes according to the RI, or the RI and PTI, or the RI and PMI0 of the CSI reference processes corresponding to the CSI processes.

11. The base station according to claim 10, wherein, the processor is further set such that:

when the base station configures the number of ports for the non-zero power (NZP) CSI-RS of the CSI processes respectively as eight, all are configured with RI feedback and CSI reference processes, and a Physical Uplink Control Channel feedback mode is a sub-mode 1 of 1-1 or a PUCCH feedback mode 2-1; or when the base station configures the number of ports for the NZP CSI-RS of the CSI processes respectively as eight, all are configured with RI feedback and CSI reference processes, a PUCCH feedback mode is a sub-mode 1 of 1-1 or a PUCCH feedback mode 2-1, and collision of RI or PTI sub-frames of the CSI processes and of the configured CSI reference processes or collision of RI or PMI0 sub-frames of the CSI processes and of the configured CSI reference processes occurs and results in discarding, the base station configures the CSI processes and the corresponding CSI reference processes to have the same feedback mode and/or feedback type; or when the base station configures the number of ports for the NZP CSI-RS of the CSI processes respectively as eight and all are configured with RI feedback, CSI reference processes and periodic feedback; or when the base station configures the number of ports for the NZP CSI-RS of the CSI processes respectively as eight, all are configured with RI feedback, CSI reference processes and periodic feedback, and collision of RI or PTI sub-frames of the CSI processes and of the configured CSI reference processes or collision of RI or PMI0 sub-frames of the CSI process and of the configured CSI reference processes occurs and results in discarding, the base station configures the CSI processes and the corresponding CSI reference processes to have the same feedback mode and/or feedback type.

12. The base station according to claim 10, wherein, the processor is set to:

when the CSI reference processes and non-CSI reference processes feed back that collision of sub-frames of the RI, or the RI and PTI, or the RI and PMI0 of CSI occurs and results in discarding, receive the CSI report of the CSI processes corresponding to the CSI reference processes preferentially according to the RI, or the RI and PTI, or the RI and PMI0 corresponding to the CSI reference processes; or when the CSI reference processes and the CSI processes corresponding to the CSI reference processes feed back that collision of sub-frames of the RI, the RI and PTI, or the RI and PMI0 occurs and results in discarding, receive the CSI report of the CSI processes corresponding to the CSI reference processes according to the RI, or the RI and PTI, or the RI and PMI0 corresponding to the CSI reference processes; or when an index priority of the CSI reference processes is lower than that of the CSI processes corresponding to the CSI reference processes, and both feed back that collision of sub-frames of the RI, or the RI and PTI, or the RI and PMI0 occurs and results in discarding, receive the CSI report of the CSI processes corresponding to the CSI reference processes according to the RI, or the RI and PTI, or the RI and PMI0 corresponding to the CSI reference processes, or limit that the index priority of the CSI reference processes must be higher than that of the CSI processes corresponding to the CSI reference processes; or when collision of the RI, or the PTI and RI, or the RI and PMI0 corresponding to the CSI reference processes with other CSI processes occurs and results in discarding, receive the CSI report of the CSI processes corresponding to the CSI reference processes according to the RI, or RI and PTI, or RI and PMI0 corresponding to the last fed-back CSI reference process; or when collision of RI sub-frames of the CSI reference processes with RI or PTI joint coding sub-frames of the CSI processes corresponding to the CSI reference processes occurs and results in discarding, receive the CSI report of the CSI processes corresponding to the CSI reference processes according to the RI of the CSI reference processes and the last fed-back PTI or PTI=0 or PTI=1; or when collision of RI sub-frames of the CSI reference processes with RI or PMI0 joint coding sub-frames of the CSI processes corresponding to the CSI reference processes occurs and results in discarding, receive the CSI report of the CSI processes corresponding to the CSI reference processes according to the RI corresponding to the CSI reference processes and the PMI0 last fed-back by the CSI processes; or when collision of RI or PTI joint coding sub-frames of the CSI reference processes with RI or PTI joint coding sub-frames of the CSI processes corresponding to the CSI reference processes occurs and results in discarding, receive the CSI report of the CSI processes according to the RI or PTI corresponding to the CSI reference processes; or when collision of RI or PTI joint coding sub-frames of the CSI reference processes with RI or PTI joint coding sub-frames of the CSI processes corresponding to the CSI reference processes occurs and results in discarding, receive the CSI report of the CSI processes according to the RI corresponding to the CSI reference processes and the last fed-back PTI, the CSI report comprising a PMI and/or a channel quality indicator (CQI); or when collision of RI or PMI0 joint coding sub-frames of the CSI reference processes with RI or PMI0 joint coding sub-frames of the CSI processes corresponding to the CSI reference processes occurs and results in discarding, receive the CSI report of the CSI processes according to the RI or the CQI corresponding to the CSI reference processes, the CSI report comprising a PMI and/or a CQI; or when collision of RI or PTI joint coding sub-frames of the CSI reference processes with RI or PMI0 joint coding sub-frames of the CSI processes corresponding to the CSI reference processes occurs and results in discarding, receive the CSI report of the CSI processes according to the RI corresponding to the CSI reference processes and the last fed-back PMI0, the CSI report comprising a PMI and/or a CQI; or when collision of RI or PMI0 joint coding sub-frames of the CSI reference processes with RI or PMI0 joint coding sub-frames of the CSI processes corresponding to the CSI reference processes occurs and results in discarding, receive the CSI report of the CSI processes according to the RI corresponding to the CSI reference processes and the last fed-back PTI or PTI=0 or PTI=1; or when collision of the RI corresponding to the CSI reference processes with other CSI processes occurs and results in discarding, receive the CSI report of the CSI reference processes according to the RI corresponding to the last fed-back CSI reference process, and receive the CSI report of the CSI processes according to an RI calculated by a current sub-frame; or when collision of the RI corresponding to the CSI reference processes with other CSI processes occurs and results in discarding, receive the CSI report of the CSI reference processes according to the RI corresponding to the last fed-back CSI reference process or the RI fed back by the CSI processes corresponding to the CSI reference processes.

13. A terminal, comprising a processor configured to:
acquire CSI processes from a base station; and
when part or all of the CSI processes acquired by the acquisition module are configured with CSI reference processes, the terminal calculates a CSI report of the CSI processes configured with the CSI reference processes according to a rank indicator (RI), or the RI and a precoding type indicator (PTI), or the RI and a precoding matrix indicator (PMI0) corresponding to the CSI reference processes wherein,
the processor is set to, when a CSI process of the terminal is configured with a corresponding CSI reference process, update the PMI and the CQI according to the RI of the corresponding CSI reference process;
preferably, the processor is set to: calculate and update the PMI and the CQI according to the RI fed back by the last CSI reference process on PMI or PMI0 feedback sub-frames of the CSI process; or calculate and update the PMI and the CQI according to the RI fed back by the last CSI reference process on RI feedback sub-frames of the CSI process.

14. The terminal according to claim 13, wherein,
the processor is further set to: when collision of the RI, or the RI and PTI, or the RI and PMI0 corresponding to a plurality of CSI processes fed back by the terminal occurs on partial or all sub-frames and results in discarding, calculate the CSI report corresponding to the CSI processes according to the RI, or the RI and PTI, or the RI and PMI0 corresponding to the CSI reference processes.

15. The terminal according to claim 13, wherein,
the CSI report comprises one or more of the following contents: PMI, CQI, PMI0 and PMI1,
or, the processor is further set such that:
when a CSI process of the terminal is configured with a corresponding CSI reference process, the terminal determines that the CSI process and the CSI reference process have a same feedback mode and feedback type; or when a CSI process of the terminal is configured with a corresponding CSI reference process and periodic feedback, the terminal determines that the CSI process and the CSI reference process have the same feedback mode and feedback type; or when a number of ports for non-zero power (NZP) channel state information reference signals (CSI-RS) of CSI reference processes and CSI processes configured with the CSI reference processes is respectively configured as eight, and all are configured with RI feedback, the terminal determines that the CSI processes and the CSI reference processes have the same feedback mode and feedback type; or when the number of ports for NZP CSI-RS of CSI reference processes and CSI processes configured with the CSI reference processes is respectively configured as eight, and all are configured with RI feedback and periodic feedback, the terminal determines that the CSI processes and the CSI reference processes have the same feedback mode and feedback type; or when the number of ports for NZP CSI-RS of CSI processes is respectively configured as eight, all are configured with RI feedback and CSI reference processes, and a PUCCH feedback mode is a sub-mode 1 of 1-1 or a PUCCH feedback mode 2-1; or when the number of ports for NZP CSI-RS of CSI processes is respectively configured as eight, all are configured with RI feedback and CSI reference processes, a PUCCH feedback mode is a sub-mode 1 of 1-1 or a PUCCH feedback mode 2-1, and when collision of RI or PTI sub-frames or collision of RI or PMI0 sub-frames of the CSI processes and of the configured CSI reference processes occurs and results in discarding, the terminal determines that the CSI processes and the CSI reference processes have the same feedback mode and feedback type; or when the terminal is configured as aperiodic feedback, the terminal determines that the configured CSI reference processes are effective to the corresponding CSI processes; or when the terminal is configured as aperiodic feedback and the corresponding CSI reference processes are also CSI processes of aperiodic feedback, the terminal determines that the configured CSI reference processes are effective to the corresponding CSI processes; or when a CSI process of the terminal is configured with a corresponding CSI reference process and the CSI process is in a feedback mode 2-1, the terminal determines that the CSI reference process and the CSI process have the same feedback mode and feedback type; or when a CSI process of the terminal is configured with a corresponding CSI reference process and the CSI process is in a sub-mode 1 of a feedback mode 1, the terminal determines that the CSI reference process and the CSI process have the same feedback mode and feedback type.

16. The terminal according to claim 15, wherein, the processor is set to:

when sub-frames for feeding back the RI, or the RI and PTI, or the RI and PMI0 of CSI of the CSI reference processes and non-CSI reference processes collide and result in discarding, preferentially feed back the RI, or the RI and PTI, or the RI and PMI0 corresponding to the CSI reference processes; or when sub-frames for feeding back the RI, or the RI and PTI, or the RI and PMI0 of CSI of the CSI reference processes and the CSI processes corresponding to the CSI reference processes collide and result in discarding, preferentially feed back the RI, or the RI and PTI, or the RI and PMI0 corresponding to the CSI reference processes; or when an index priority of the CSI reference processes is lower than that of the CSI processes corresponding to the CSI reference processes, and the sub-frames for feeding back the RI, the RI and PTI, or the RI and PMI0 of the CSI reference processes and the CSI processes collide and result in discarding, preferentially feed back the RI, or the RI and PTI, or the RI and PMI0 corresponding to the CSI reference processes, or limit that the index priority of the CSI reference processes must be higher than that of the CSI processes; or when collision of the RI, the RI or PTI, or the RI or PMI0 corresponding to the CSI reference processes with other CSI processes occurs and results in discarding, calculate CSI reports of the CSI reference processes and the CSI processes corresponding to the CSI reference processes according to the RI, or the RI and PTI, or the RI and PMI0 of the last fed-back CSI reference process; or when collision of RI sub-frames of the CSI reference processes with RI or PTI joint coding sub-frames of the CSI processes corresponding to the CSI reference processes occurs and results in discarding, calculate the CSI report of the CSI processes according to the RI of the CSI reference processes and the last fed-back PTI or PTI=0 or PTI=1, and feed back the RI of the CSI reference processes; or when collision of RI sub-frames of the CSI reference processes with RI or PMI0 joint coding sub-frames of the CSI processes corresponding to the CSI reference processes occurs and results in discarding, calculate the CSI report of the CSI processes according to the RI of the CSI reference processes and the PMI0 last fed-back by the CSI processes, and feed back the RI of the CSI reference processes; or when collision of RI or PTI joint coding sub-frames of the CSI reference processes and of the CSI processes corresponding to the CSI reference processes occurs and results in discarding, calculate the CSI report of the CSI processes according to the RI or the PTI of the CSI reference processes, and feed back the RI or the PTI of the CSI reference processes and the calculated CSI report; or when collision of RI or PTI joint coding sub-frames of the CSI reference processes and of the CSI processes corresponding to the CSI reference processes occurs and results in discarding, calculate the CSI report according to the RI of the CSI reference processes and the last fed-back PTI, and feed back the RI or the PTI of the CSI reference processes, and the calculated CSI report, the CSI report comprising a PMI and/or a channel quality indicator (CQI); or when collision of RI or PMI0 joint coding sub-frames of the CSI reference processes and of the CSI processes corresponding to the CSI reference processes occurs and results in discarding, calculate the CSI report according to the RI or the PMI0 of the CSI reference processes, and feed back the RI or the PMI0 of the CSI reference processes and the calculated CSI report, the CSI report comprising a PMI and/or a CQI; or when collision of RI or PTI joint coding sub-frames of the CSI reference processes with RI or PMI0 joint coding sub-frames of the CSI processes corresponding to the CSI reference processes occurs and results in discarding, calculate the CSI report of the CSI processes according to the RI of the CSI reference processes and the last fed-back PMI0, and feed back the RI or the PTI of the CSI reference processes and the calculated CSI report, the CSI report comprising a PMI and/or a CQI; or when collision of RI or PMI0 joint coding sub-frames of the CSI reference processes and of the CSI processes corresponding to the CSI reference processes occurs and results in discarding, calculate the CSI report of the CSI processes according to the RI of the CSI reference processes and the last fed-back PTI or PTI=0 or PTI=1, and feed back the RI or the PTI of the CSI reference processes and the calculated CSI report; or when collision of the RI corresponding to the CSI reference processes with other CSI processes occurs and results in discarding, calculate and feed back the CSI report of the CSI reference processes according to the last fed-back RI of the CSI reference processes, and calculate and feed back the CSI report of the CSI processes corresponding to the CSI reference processes according to an RI calculated by a current sub-frame; or when collision of the RI corresponding to the CSI reference processes with other CSI processes occurs and results in discarding, calculate and feed back the CSI of the CSI reference processes according to the last fed-back RI of the CSI reference processes or the RI fed back by the CSI processes corresponding to the CSI reference processes.

* * * * *